United States Patent
Park et al.

(10) Patent No.: US 9,641,963 B2
(45) Date of Patent: May 2, 2017

(54) METHOD AND APPARATUS FOR REPRODUCING MULTIMEDIA CONTENTS USING BLUETOOTH IN WIRELESS COMMUNICATION SYSTEM

(71) Applicant: LG ELECTRONICS INC., Seoul (KR)

(72) Inventors: Jangwoong Park, Seoul (KR); Jingu Choi, Seoul (KR); Hyeonjae Lee, Seoul (KR); Minsoo Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/899,671

(22) PCT Filed: Jun. 20, 2014

(86) PCT No.: PCT/KR2014/005483
§ 371 (c)(1),
(2) Date: Dec. 18, 2015

(87) PCT Pub. No.: WO2014/204272
PCT Pub. Date: Dec. 24, 2014

(65) Prior Publication Data
US 2016/0142865 A1     May 19, 2016

Related U.S. Application Data

(60) Provisional application No. 61/837,179, filed on Jun. 20, 2013.

(51) Int. Cl.
*H04W 4/00*     (2009.01)
*H04L 29/06*     (2006.01)

(52) U.S. Cl.
CPC ......... *H04W 4/008* (2013.01); *H04L 65/1083* (2013.01)

(58) Field of Classification Search
CPC ..................................................... H04W 4/008
(Continued)

(56) References Cited

U.S. PATENT DOCUMENTS

| 8,019,272 B2 * | 9/2011 | Masuda | H04H 20/61 |
| | | | 455/3.01 |
| 2002/0068610 A1 * | 6/2002 | Anvekar | H04M 1/6066 |
| | | | 455/560 |

(Continued)

FOREIGN PATENT DOCUMENTS

| KR | 10-2012-0009536 A | 2/2012 |
| KR | 10-2012-0017278 A | 2/2012 |

(Continued)

OTHER PUBLICATIONS

International Search Report dated Oct. 20, 2014, for International application No. PCT/KR2014/005483.

(Continued)

*Primary Examiner* — Wen Huang
(74) *Attorney, Agent, or Firm* — Morgan, Lewis & Bockius LLP

(57) ABSTRACT

A wireless communication system plays multimedia content using Bluetooth communication. The wireless communication system includes receiving a request message related to allowing streaming of second multimedia content of a second source device from the sink device by a first source device streaming first multimedia content; determining whether to allow streaming of the second multimedia content of the second source device; transmitting a response message including a determination result for whether to allow streaming of the second multimedia content to the sink device in response to the request message; transmitting a message for stopping streaming of the second multimedia content to the sink device, when the first source device allows streaming of the second multimedia content; and (Continued)

receiving a streaming stop response message from the sink device responsive to the streaming stop message. The request message includes one of a name, MAC address, and ID of the second source device.

13 Claims, 20 Drawing Sheets

(58) Field of Classification Search
USPC .................................. 455/41.1, 41.2, 41.3
See application file for complete search history.

(56) References Cited

U.S. PATENT DOCUMENTS

| | | | |
|---|---|---|---|
| 2003/0223604 A1* | 12/2003 | Nakagawa | H04M 1/6066 381/311 |
| 2008/0051156 A1* | 2/2008 | Matsuda | H04M 1/6075 455/569.2 |
| 2009/0061769 A1 | 3/2009 | Zimbric et al. | |
| 2012/0047235 A1 | 2/2012 | Ban et al. | |
| 2012/0110625 A1 | 5/2012 | Bae et al. | |
| 2012/0189140 A1* | 7/2012 | Hughes | H04M 3/56 381/123 |
| 2012/0237053 A1* | 9/2012 | Alam | H04L 12/00 381/80 |
| 2013/0029604 A1* | 1/2013 | Saito | H04W 76/028 455/41.2 |
| 2013/0182798 A1* | 7/2013 | Lozano | H04L 65/4084 375/340 |
| 2013/0243390 A1* | 9/2013 | Yoshio | H04N 9/87 386/230 |
| 2014/0038658 A1* | 2/2014 | Sato | H04L 63/104 455/519 |
| 2014/0179229 A1* | 6/2014 | Lin | H04W 8/005 455/41.2 |
| 2014/0256259 A1* | 9/2014 | Tse | H04W 4/008 455/41.2 |

FOREIGN PATENT DOCUMENTS

| | | |
|---|---|---|
| KR | 10-2012-0046874 A | 5/2012 |
| KR | 10-2012-0136480 A | 12/2012 |
| WO | 2008/011384 A2 | 1/2008 |
| WO | 2012/120950 A1 | 9/2012 |

OTHER PUBLICATIONS

Korean Office Action dated Dec. 14, 2016, for corresponding Korean patent application No. 10-2015-7034476.

* cited by examiner

FIG. 1
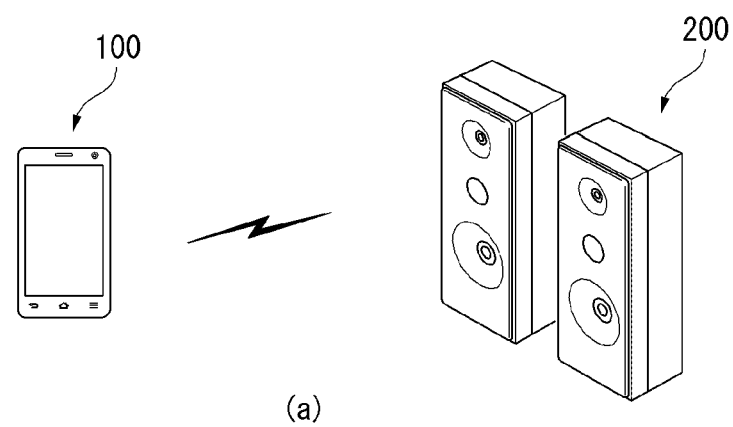
(a)
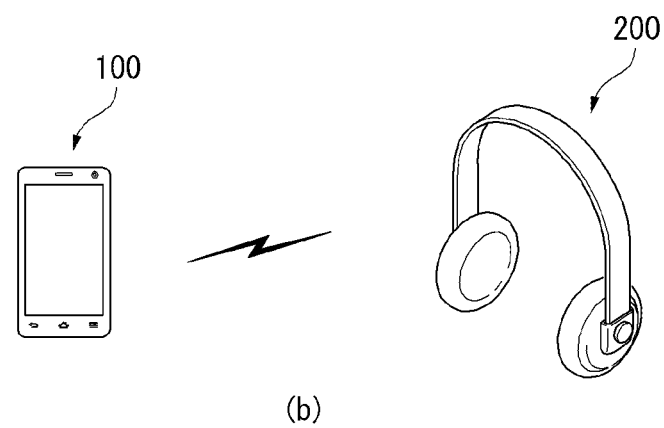
(b)

FIG. 3
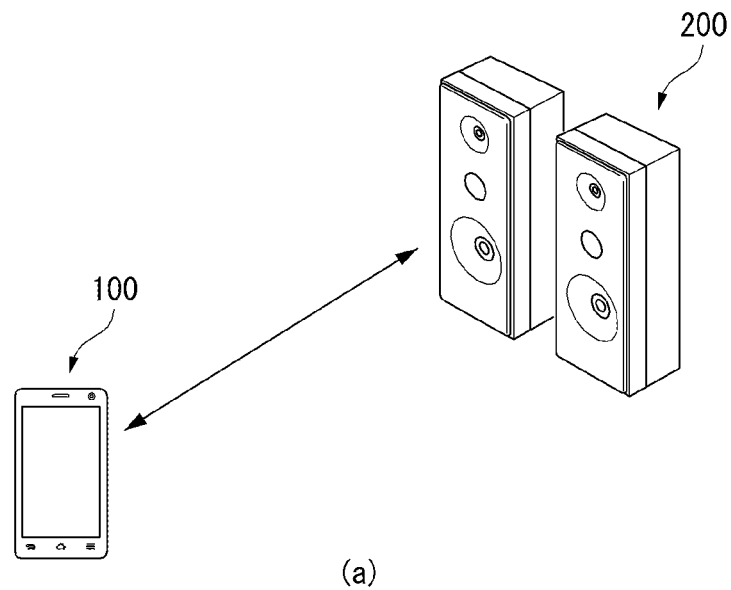
(a)
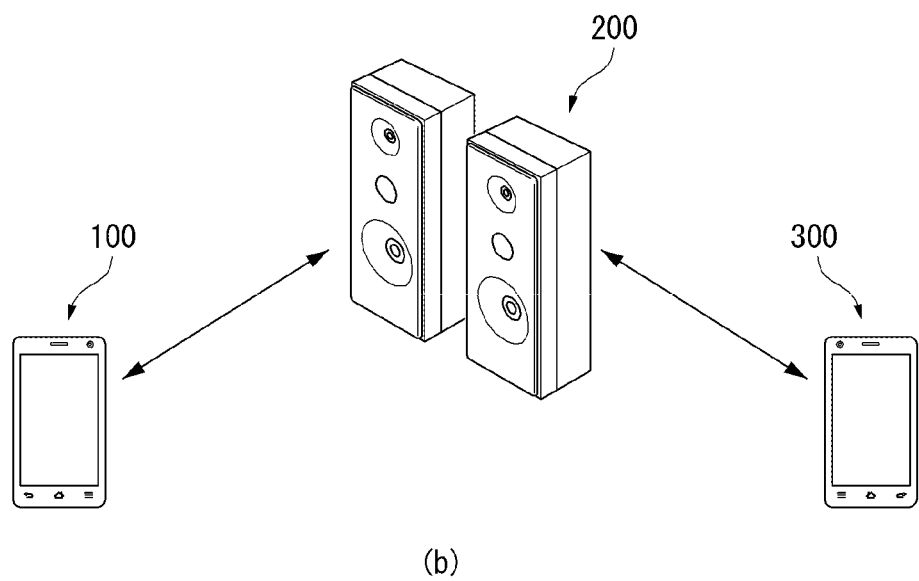
(b)

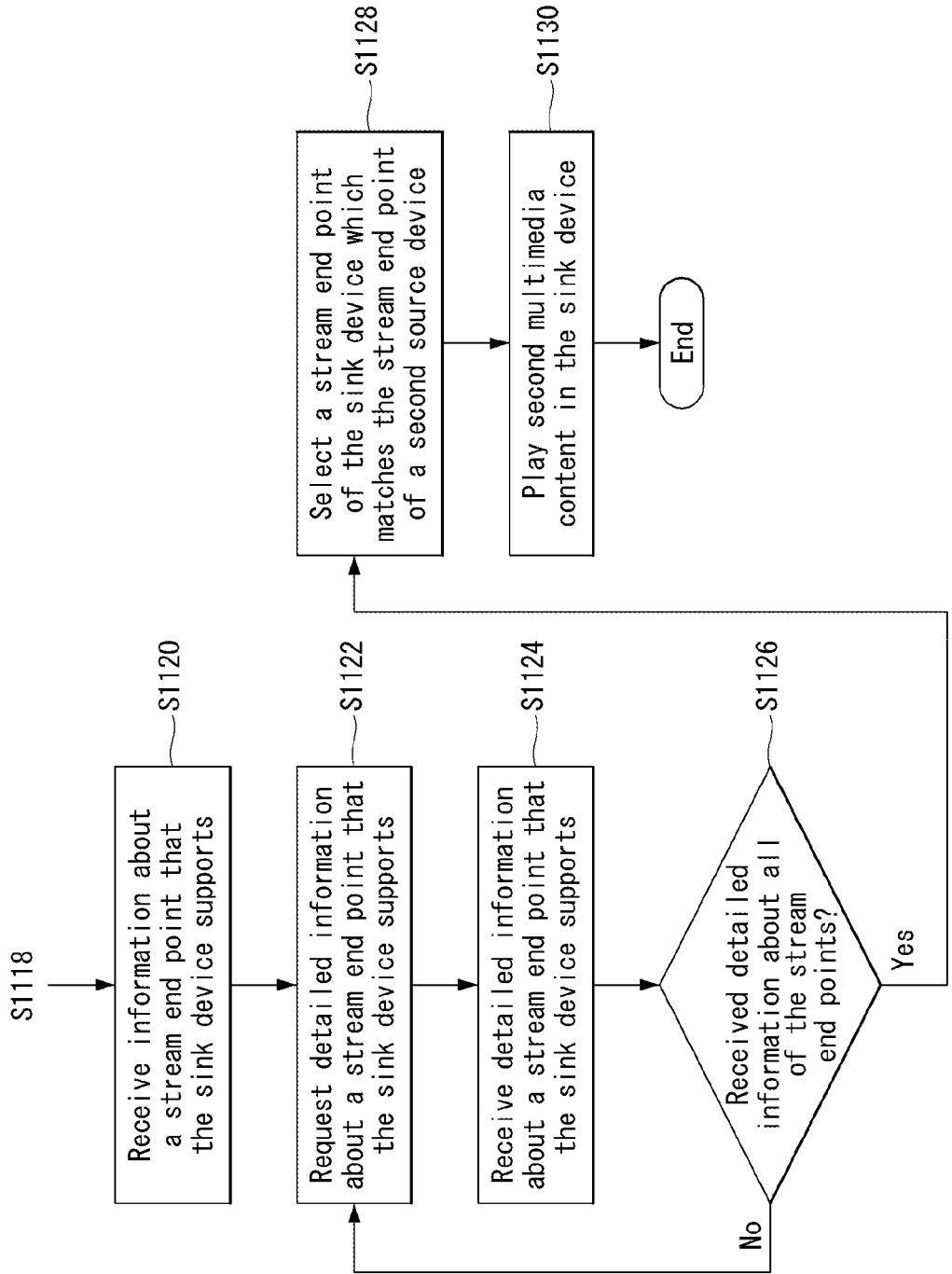

METHOD AND APPARATUS FOR REPRODUCING MULTIMEDIA CONTENTS USING BLUETOOTH IN WIRELESS COMMUNICATION SYSTEM

TECHNICAL FIELD

The present invention relates to a method for playing contents and more particularly, a method and an apparatus for playing multimedia contents by using Bluetooth, a short range wireless communication technology.

BACKGROUND ART

Bluetooth is a Radio Frequency (RF) specification proposed for transmission of point-to-multi-point voice and data over short distances.

A Bluetooth signal can penetrate solids and non-metallic materials. The typical transmission range is from 10 cm to 10 m; however, with increased transmission power, the range can be extended up to 100 m. Bluetooth technology is based on a short range wireless link and facilitates ad-hoc connections in a fixed and a mobile communication environment.

Bluetooth operates at frequencies around 2.4 GHz and uses short range communication based on frequency-hopping spread spectrum technology. Although Bluetooth provides relatively high data transfer speeds with relatively low power at a low cost, the transmission range is limited up to 100 m, and thus, it is appropriate for use in a limited-scale environment.

By using the Bluetooth technology, one can play contents stored in different electronic devices belonging to the same, limited area through various output devices such as a speaker and a headset with low power consumption.

If a source device (which denotes a device storing multimedia contents) attempts to connect to a sink device while the sink device is already playing contents stored in another source device, a user has to manually release the existing connection to the source device since no specific connection release method is available.

DISCLOSURE

Technical Problem

An object of the present invention is to provide a method and an apparatus for playing multimedia contents in a wireless communication system.

Another object of the present invention is to provide a method and an apparatus for playing multimedia contents by using Bluetooth in a wireless communication system.

A yet another object of the present invention is to provide a method and an apparatus for playing contents stored in a source device through a sink device by using Bluetooth in a wireless communication system.

A still another object of the present invention is to provide a method and an apparatus for determining a source device which contains contents to play in case the contents are stored in two or more source devices and are to be played through a sink device by using Bluetooth communication.

A further object of the present invention is to provide a method and an apparatus for transition of play control among source devices in case multiple source devices try to play multimedia content through the same sink device.

The advantageous effects that can be obtained from the present invention are not limited to those described above, and other effects not mentioned above can be understood clearly from the following descriptions by those skilled in the art to which the present invention belongs.

Technical Solution

To achieve the objectives above, a method for content streaming through a wireless communication system including a plurality of source devices and one sink device according to the present invention comprises receiving a request message related to allowing streaming of second multimedia content of a second source device from the sink device by a first source device streaming first multimedia content; determining, by the first source device, whether to allow streaming of the second multimedia content of the second source device; transmitting, by the first source device, a response message including a determination result for whether to allow streaming of the second multimedia content to the sink device in response to the request message; transmitting, by the first source device, streaming stop message of the first multimedia content to the sink device, when the first source device allows streaming of the second multimedia content; and receiving, by the first device, a streaming stop response message from the sink device in response to the streaming stop message, where the request message includes one from among a name, MAC address, and ID of the second source device.

The first source device enters an idle state, when the steaming stop response message is received.

The first source device streams the first multimedia content to the sink device, and the second device enters an idle state, when the first source device in the idle state receives a play signal from a user.

The determining whether to allow streaming of the second multimedia content is based on an input signal from a user or priority.

The priority is included in the request message, when the priority is used to determine whether to allow streaming.

A method for content streaming through a wireless communication system including a plurality of source devices and one sink device according to the present invention comprises connecting to a second source device by the sink device playing first multimedia content of a first source device for multimedia content streaming; determining, by the sink device, whether to allow streaming of the second multimedia content of the connected second source device; transmitting, by the sink device, a determination result message for whether to allow the streaming to the first and the second source device; receiving, by the sink device, a streaming stop message of the first multimedia content from the first source device, when the sink device allows streaming of the second multimedia content; and transmitting, by the sink device, a streaming stop response message to the first source device in response to the streaming stop message.

Wherein the first source device enters an idle state, when the streaming stop response message is received.

The determining whether to allow streaming of the second multimedia content is based on an input signal from a user or priority.

When the priority is used to determine whether to allow streaming, the method for content streaming further comprises receiving a first message including a first parameter for determining the priority from the first source device; and receiving a second message including a second parameter for determining the priority from the second source device, where the first parameter is related to the state and the surroundings of the first source device, and the second parameter is related to the state and the surroundings of the second source device.

The first parameter and the second parameter include at least one of an amount of remaining battery, availability of power source, an average value of computing resources, Received Signal Strength Indication (RSSI), or the number of connections.

A device according to the present invention comprises a communication unit for carrying out wired or wireless communication to and from the outside; and a controller functionally connected to the communication unit, where the controller controls the communication unit to receive a request message related to allowing streaming of second multimedia content of a second source device from a sink device, determines whether to allow streaming of the second multimedia content of the second source device, controls the communication unit to transmit a response message including a determination result for whether to allow streaming of the second multimedia content to the sink device in response to the request message, controls the communication unit to transmit a streaming stop message of the first multimedia content to the sink device, when streaming of the second multimedia content is allowed, and controls the communication unit to receive a streaming stop response message from the sink device in response to the streaming stop message, where the request message includes one from among a name, MAC address, and ID of the second source device.

The controller controls the first source device to enter an idle state, when the streaming stop response message is received.

The device further comprises a user interface for receiving a signal from a user, where the controller controls a output unit to stream the first multimedia content, when a play signal is received from the user interface.

The controller determines whether to allow streaming of the second multimedia content on the basis of an input signal from a user or priority.

The priority is included in the request message.

A device according to the present invention comprises a communication unit for carrying out wired or wireless communication to and from the outside; an output unit for streaming the multimedia content; and a controller functionally connected to the communication unit, where the controller controls a connection to a first source device or a second source device for streaming of the multimedia content, controls the output unit to stream first multimedia content of the first source device or second multimedia content of the second source device, determines whether to allow streaming of the second multimedia content of the connected second source device, controls the communication unit to transmit a determination result message for whether to allow the streaming to the first and the second source device, controls the communication unit to receive a streaming stop message of the first multimedia content from the first source device, when streaming of the second multimedia content is allowed, and controls the communication unit to transmit the streaming stop response message to the first source device in response to the streaming stop message.

The controller determines whether to allow streaming of the second multimedia content on the basis of an input signal of a user or priority.

When the priority is used to determine whether to allow streaming, the controller controls the communication unit to receive a first message including a first parameter for determining the priority from the first source device; and controls the communication unit to receive a second message including a second parameter for determining the priority from the second source device, where the first parameter is related to the state and the surroundings of the first source device, and the second parameter is related to the state and the surroundings of the second source device.

The first and the second parameter include at least one of an amount of remaining battery, availability of power source, an average value of computing resources, Received Signal Strength Indication (RSSI), or the number of connections.

Advantageous Effects

A method and an apparatus for playing multimedia content by using Bluetooth in a wireless communication system according to the present invention provides advantageous effects as follows.

According to the present invention, multimedia content can be played by using Bluetooth communication.

According to the present invention, multimedia content stored in a source device can be played in a sink device by using Bluetooth communication.

In case a plurality of source devices attempt to play their multimedia content through the same sink device by using Bluetooth communication, the present invention can determine the source device which contains multimedia content to be played.

In case a plurality of source devices attempts to play their multimedia content through the same sink device, the present invention can provide a method for transition of play control.

In case multimedia content stored in a source device is being played in a sink device and a different device attempts to play multimedia content through the same sink device, the present invention enables a user to release the existing connection to the source device and to play multimedia content stored in the different device.

BRIEF DESCRIPTION OF THE DRAWINGS

FIG. 1 illustrates one example of playing multimedia content by using Bluetooth.

FIG. 3 illustrates one example where a plurality of devices plays multimedia content through the same sink device.

FIGS. 11a and 11b illustrate a procedure of carrying out a method for playing multimedia content by a second source device according to the present invention.

MODE FOR INVENTION

Figure 2:
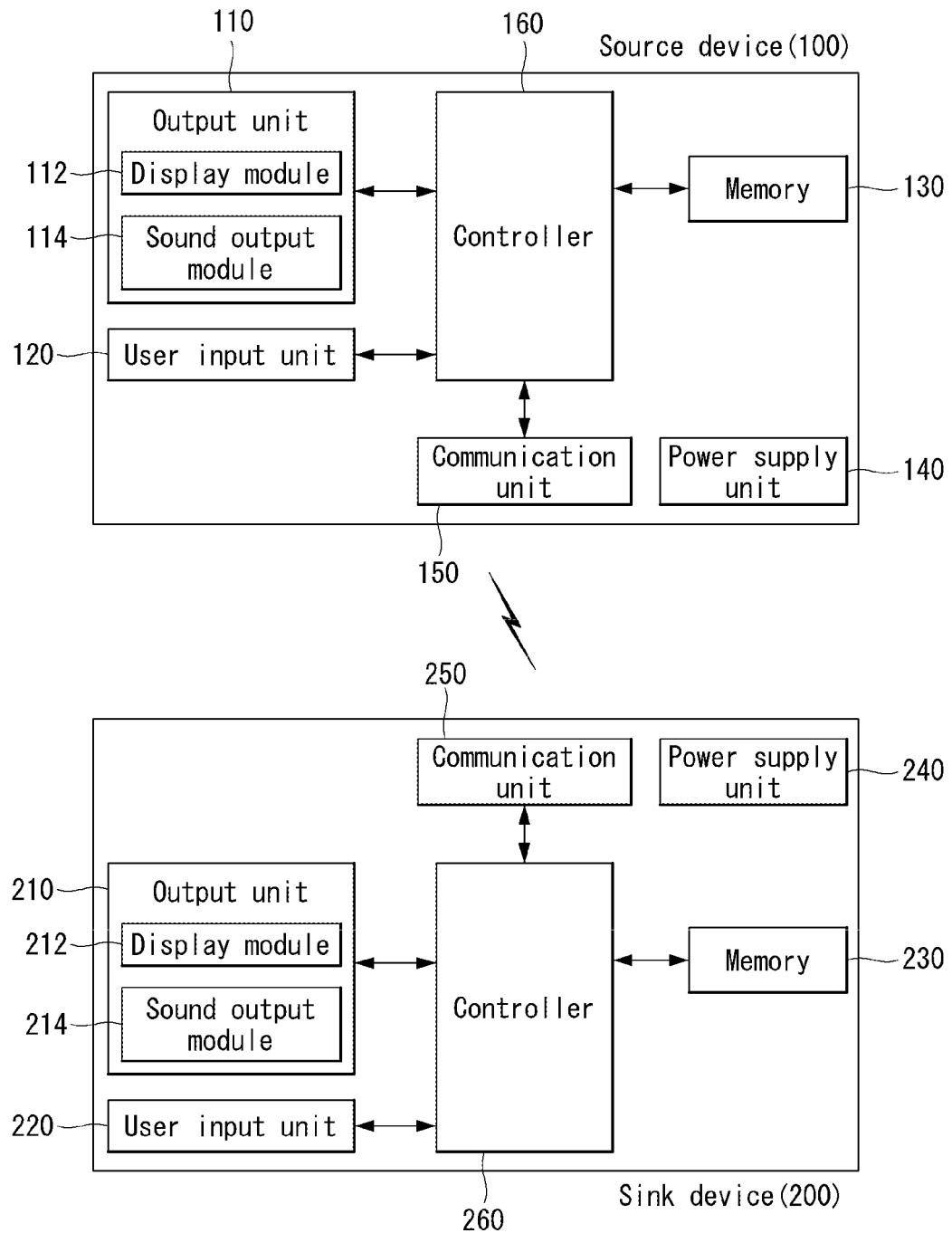
FIG. 2 illustrates one example of internal block diagrams of a Bluetooth source device and a sink device.

The technical object, characteristics, and advantages of the present invention will now be more clearly understood from detailed descriptions given below with reference to appended drawings. It should be noted that the present invention can be modified in various ways and various embodiments can be implemented according to the present invention; therefore, in what follows, specific embodiments will be illustrated in the appended drawings and described in detail. Throughout the document, the same reference number represents the same component. In the following description, if it is decided that the detailed description of a known function or configuration related to the invention obscures the technical principles of the present invention, the corresponding description is omitted.

In what follows, a method and an apparatus according to the present invention will be described in more detail with reference to appended drawings. A suffix such as "module" and "unit" may be assigned or used interchangeably to refer to elements or components. Use of such a suffix herein is merely intended to facilitate description of the specification, and the suffix itself is not intended to give any special meaning or function.

Electronic devices in this document may include a cellular phone, a smart phone, a laptop computer, a digital broadcasting terminal, personal digital assistants (PDA), a portable multimedia player (PMP), and a navigation terminal; however, it should be clearly understood by those skilled in the art that except for those specific cases applicable only to a mobile terminal, the structure according to the embodiments according to the present invention can also be applied to fixed terminals such as a digital TV and a desktop computer.

A signal described in this document can be transmitted in the form of not only a message but also a frame.

FIG. 1 illustrates one example of playing multimedia content by using Bluetooth.

With reference to FIG. 1, an apparatus transmitting and receiving audio/video data by using Bluetooth is called a source device 100, while an apparatus receiving and outputting audio/video data is called a sink device 200.

Also, an apparatus which initiates a procedure by transmitting a specific message is called an initiator (INT), and an apparatus which receives the specific message is called an acceptor (ACP).

In what follows, descriptions will be given by denoting the initiator as INT and the acceptor as ACP.

In order to play multimedia content through Bluetooth streaming, at least one source device 100 and at least one sink device 200 are required.

At this time, the source device 100 refers to all kinds of electronic devices being capable of Bluetooth communication and storing multimedia content; and the sink device 200 refers to all kinds of electronic devices capable of Bluetooth communication and capable of playing the multimedia content.

In a conventional manner, multimedia contents such as audio/video files are played by electronic devices such as MP2 player, PC, and notebook computer which store the multimedia contents therein or by other electronic devices connected in a wired manner to the electronic devices.

However, by using Bluetooth communication, multimedia contents stored in an electronic device can be played by another electronic device in the vicinity thereof without using a wired connection.

Recent Bluetooth communication specifications include Bluetooth BR/EDR (Basic Rate/Enhanced Data Rate) version and have evolved to include Bluetooth Low Energy (BLE) technology. The BLE technology features a relatively small duty cycle, low manufacturing costs, and significant reduction of power consumption based on low data transfer speeds, allowing operation for more than one year when coin cell battery is used.

Also, the BLE technology simplifies a connection procedure between devices and uses a smaller packet size compared with the Bluetooth BR/EDR technology.

The BLE technology supports (1) up to 40 RF channels, (2) 1 Mbps data transfer rate, and (3) star topology. And the BLE technology features (4) communication latency of 3 ms, (5) the maximum current of less than 15 ms, (6) and output power of less than 10 mW (10 dBm); and (7) main applications of the BLE technology include mobile phone, watch, sports, health-care, sensor, and instruments and control.

Bluetooth specification comprises lower layer technology and upper layer technology.

Most of the lower layer technologies are related to hardware such as radio, base band, and link manager; and firmware operating on the hardware.

The upper layer technologies are related mostly to protocols operating in those devices such as computers, Personal Digital Assistants (PDAs), and mobile phones; and application software.

In a Bluetooth network, the Audio/Video Distribution Transport Protocol (AVDTP), a protocol for transmission of audio/video streams, is divided into two functions of signaling and streaming.

Streaming protocol defines real-time transmission of an audio/video stream, while signaling protocol is used to carry out negotiation such as formatting so that a sink device 200 can receive and process an audio/video stream transmitted from a source device 100.

With reference to FIG. 1, a source device 100 plays multimedia content stored therein through a sink device 200 by using wireless streaming.

The source device 100 transmits the multimedia content stored therein to a play device such as the sink device 200 through wireless streaming, and a play device can play the transmitted multimedia stream.

For example, (a) audio files stored in a smart phone 100, which is a source device, can be played through speakers 200, which is a sink device, or (b) audio files stored in the smart phone 100 can be played through a headset 200.

Various transfer modes such as File Transfer Profile (FTP), Advanced Audio Distribution Profile (A2DP), and Video Distribution Profile (VDP) can be utilized for implementing the wireless streaming.

Suppose a source device is playing multimedia contents through a sink device by using the Bluetooth wireless streaming above. If another source device attempts to connect to the sink device to play multimedia contents, a user has to manually release the existing connection to the current source device and connect to the another source device.

FIG. 2 illustrates one example of internal block diagrams of a Bluetooth source device 100 and a sink device 200.

With reference to FIG. 2, the source device 100 comprises an output unit 110, a user interface unit 120, a memory 130, a power supply unit 140, a communication unit 150, and a controller 160.

The output unit 110, user interface unit 120, memory 130, power supply unit 140, communication unit 150, and controller 160 are functionally interconnected to each other to carry out a method of the present invention.

Also, the sink device 200 can comprise an output unit 210, a user interface unit 220, a memory 230, a power supply unit 240, a communication unit 150, and a controller 160.

The output unit 210, user interface unit 220, memory 230, power supply unit 240, communication unit 250, and controller 260 are functionally interconnected to each other to carry out a method of the present invention.

The constituting elements shown in FIG. 2 are not necessarily required to form an electronic device; therefore, an electronic device can be implemented by using more or fewer elements than those shown in the figure.

The output unit 110, 210 generates an output related to visual, aural, tactile sensing, which includes a display module 112, 212 and a sound output module 114, 214.

The display module 112, 212 displays information processed in the device. For example, in case the device is in a communication mode, the display module displays a User Interface (UI) or a Graphic User Interface (GUI) related to communication. In case the device is in a visual communication mode or in an image capture mode, the display module displays a captured and/or received image or UI or GUI.

The display module 112, 212 can be implemented by using at least one of liquid crystal display, thin film transistor liquid crystal display, organic light emitting diode, flexible display, and 3D display.

The sound output module 114, 214 can output audio data received from the wireless communication unit 320 in a call signal reception mode, communication mode, recording mode, voice recognition mode, or broadcasting reception mode; or audio data stored in the memory 340. The sound output module 114, 214 outputs a sound signal related to the function carried out in the device (for example, call signal reception sound and a message reception sound). The sound output module 114, 214 can be implemented by a receiver, a speaker, or a buzzer.

The sink device 200 can receive multimedia content from the source device 100 through the output unit 110, 210 by using wireless streaming and output the received multimedia content.

A user generates input data for controlling operation of a terminal through the user interface unit 120, 220. The user interface unit 120, 220 can be implemented by a key pad, dome switch, (capacitive/constant pressure-type) touch pad, jog wheel, jog switch, and so on.

The memory 130, 230 can store a program for operation of the controller 160, 260 and temporarily store input/output data (for example, phonebook, message, still image, and video). The memory 130, 230 can store data related to vibration and sound of various patterns generated when a touch input is applied on the touch screen.

The memory 130, 230 stores various kinds of information about a terminal and by being connected to the controller 160, 260, is capable of storing programs for operation of the controller 160, 260, applications, ordinary files, and input/output data.

The memory 130, 230 can be implemented by using at least one type of storage media: flash memory type, hard disk type, multimedia card micro type, card type (for example, SD and XD memory), Random Access Memory (RAM), Static Random Access Memory (SRAM), Read Only Memory (ROM), Electrically Erasable Programmable Read Only Memory (EEPROM), Programmable Read Only Memory (PROM), magnetic memory, magnetic disk, and optical disk. The device can be operated by using web storage on the Internet, which performs a storage function of the memory 130, 230.

The source device 100 can store multimedia content on the memory 130, output the multimedia content through the output unit 110 of the source device 100, and output the multimedia content through the output unit 210 of the sink device 200 by using a wireless streaming method.

The power supply unit 140, 240 refers to the module which receives external and internal power under the control of the controller 160, 260 and supplies power required to operate individual constituting elements.

The communication unit 160, 260 can include one or more modules which enable wireless communication between a device and a wireless communication system or between a device and a network to which the device belongs. For example, the wireless communication unit 160, 260 can include a broadcasting reception module (not shown), a mobile communication module (not shown), a wireless Internet module (not shown), and a short range communication module (not shown).

The wireless communication unit 160, 260 can be called a transmission/reception unit.

The broadcasting reception module receives a broadcasting signal and/or broadcasting-related information from an external broadcasting management server through a broadcasting channel.

The broadcasting channel can include a satellite channel and a terrestrial channel. The broadcasting management server can refer to the server which generates and transmits a broadcasting signal and/or broadcasting-related information or the server which receives a pre-generated broadcasting signal and/or broadcasting-related information and transmits the pre-generated broadcasting signal and/or broadcasting-related information to a terminal. The broadcasting signal can include not only a TV broadcasting signal, radio broadcasting signal, and data broadcasting signal, but also a broadcasting signal which is a combination of the TV broadcasting signal or the radio broadcasting signal with the data broadcasting signal.

The broadcasting-related information can refer to the information related to a broadcasting channel, a broadcasting program, or information related to a broadcasting service provider. The broadcasting-related information can be provided through a mobile communication network. In this case, the mobile communication module can receive the broadcasting-related information.

The broadcasting-related information can be represented in various forms. For example, the broadcasting-related information can be represented in the form of the Electronic Program Guide (EPG) of Digital Multimedia Broadcasting (DMB) or the Electronic Service Guide (ESG) of Digital Video Broadcasting-Handheld (DVB-H).

The broadcasting reception module receives a broadcasting signal through various broadcasting systems. In particular, the broadcasting reception module can receive a digital broadcasting signal by using a digital broadcasting system such as Digital Multimedia Broadcasting Terrestrial (DMBT), Digital Multimedia Broadcasting Satellite (DMBS), Media Forward Link Only (MediaFLO), Digital Video Broadcasting-Handheld (DVB-H), and Integrated Services Broadcasting-Terrestrial (ISDB-T). It should be noted that the broadcasting reception module can also be structured to be suitable for other broadcasting systems providing broadcasting signals, not to mention the digital broadcasting systems above.

The broadcasting signal and/or broadcasting-related information received through the broadcasting reception module can be stored in the memory 130, 230.

The mobile communication module transmits and receives a radio signal to and from at least one of a base station, an external terminal, and a server belonging to a mobile communication network. The radio signal can include various types of data according to transmission and reception of a voice communication call signal, video communication call signal, and/or text/multimedia message.

The wireless Internet module refers to a module for wireless Internet connection and can be embedded inside or installed outside a device. Wireless Internet technologies include Wireless LAN (WLAN, WiFi), Wireless broadband (Wibro), World Interoperability for Microwave Access (Wimax), High Speed Downlink Packet Access (HSDPA) and so on.

Through the wireless Internet module, the device can establish a Wi-Fi Peer-to-Peer (P2P) connection to other devices. Through the Wi-Fi P2P connection, a streaming service between devices can be provided, and a data transmission/reception service or a printing service in conjunction with a printer can be provided.

The short range communication module refers to a module for short range communication. Short range communication technologies include Bluetooth, Radio Frequency Identification (RFID), Infrared Data Association (IrDA), Ultra Wideband (UWB), and ZigBee.

The source device 100 and the sink device 200 can output multimedia content by using data exchange and wireless streaming based on Bluetooth.

The controller 160, 260 refers to a module for controlling the overall operation of the source device 100 or the sink device 200; and can control the source or the sink device to request message transmission or to process a received message through Bluetooth interface and other communication interfaces.

The controller 160, 260 can also be called a microcontroller or a microprocessor, and can be implemented by hardware, firmware, software, or a combination thereof.

The controller 160, 260 can include Application-Specific Integrated Circuit (ASIC), other chipsets, logic circuit, and/or data processing apparatus.

The controller 160, 260 can control the output unit 110, 210 to play multimedia content through Bluetooth wireless streaming and control the communication unit 150, 250 so that the source device 100 or the sink device 200 can request wireless streaming and receive or transmit a streaming stop message.

Also, the controller 160, 260 can control whether to play or stop playing multimedia content on the basis of a signal received from the user through the user interface unit 120, 220.

FIG. 3 illustrates one example where a plurality of devices according to the present invention plays multimedia content through the same sink device.

With reference to FIG. 3, (a) multimedia content stored in a first source device 100 is being played through a sink device 200 by using a wireless streaming method based on Bluetooth communication.

In this case, (b) the same user or another user may attempt wireless streaming by using Bluetooth communication with the sink device 200 to play multimedia content stored in another source device (in what follows, it is called a second source device, 300).

Since the multimedia content stored in the first source device 100 and the multimedia content stored in the second source device 300 cannot be played simultaneously through the sink device 200, connection to one of the source devices has to be released to play multimedia content stored in the other source device.

In this case, the user had to put up with the inconvenience to manually release connection to the first source device 100 and connect the sink device to the second source device 300.

To solve the problem above, in case the second source device 300 connects to the sink device 200 to play multimedia content, the present invention can inform the first source device 100 of the connection attempt, provide a message inquiring whether to maintain or release the existing connection, and inform the second source device 300 of the inquiry result.

Through this method, in case a plurality of source devices try to play their multimedia content through one sink device, transition of play control among the source devices can be carried out conveniently.

Figure 4:
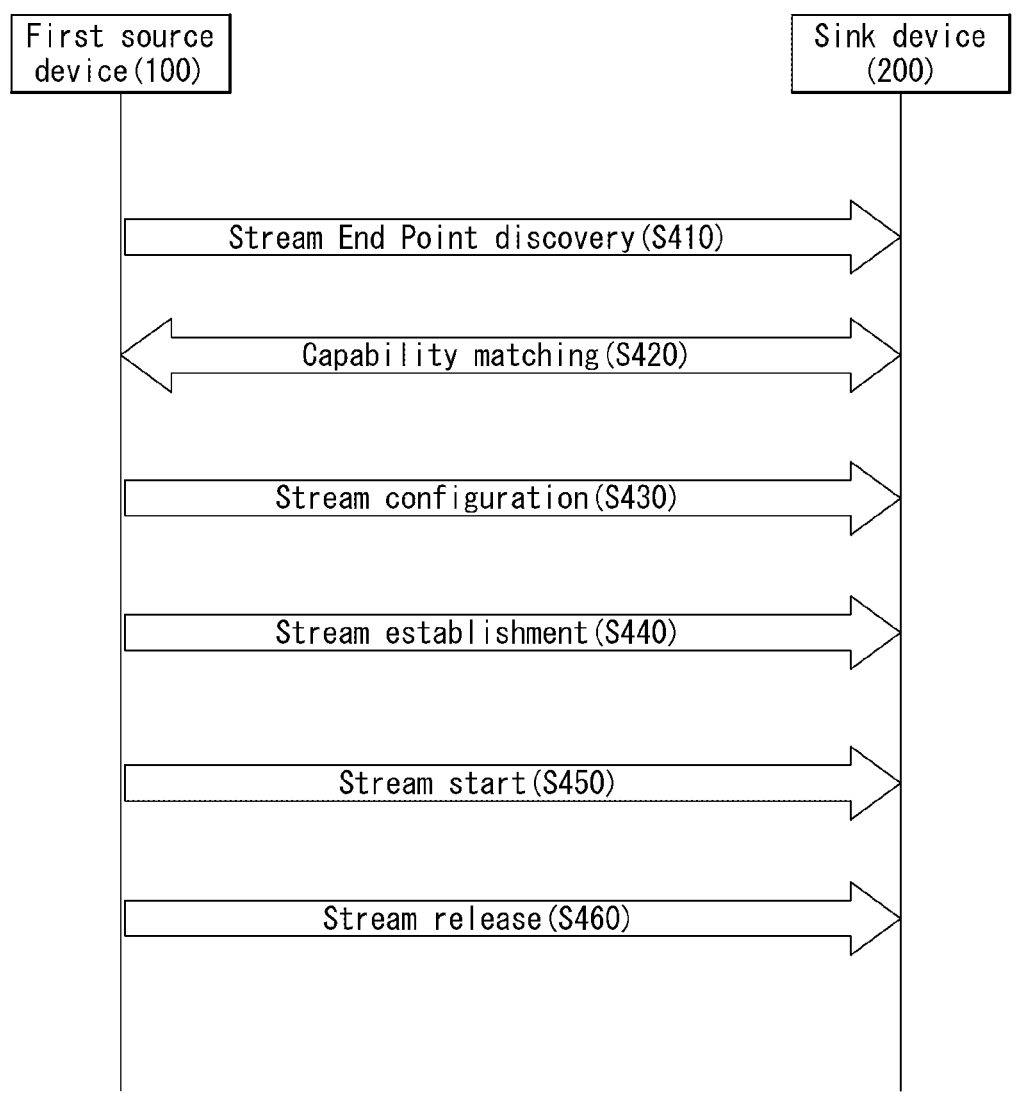
FIG. 4 illustrates a flow diagram illustrating a procedure of playing multimedia content stored in a source device through a sink device by using Bluetooth.

FIG. 4 illustrates a flow diagram illustrating a procedure of playing multimedia content stored in a source device through a sink device by using Bluetooth.

With reference to FIG. 4, the first source device 100 can transmit multimedia content to the sink device 200 and play the multimedia stream in the sink device.

As shown in the figure, the first source device 100 connects the sink device to an AVDTP signaling channel.

By carrying out a stream end point discovery procedure S410 through the connected signaling channel, the first source device 100 can obtain information about which stream system the sink device 200 responds to.

Afterwards, through the capability matching procedure S420, the first source device 100 can obtain information about a multimedia stream that the sink device 200 supports and match the obtained information to the stream end point information that the first source device 100 supports.

The first source device 100 carries out a stream configuration procedure S430 by using the multimedia stream information of the sink device 200 obtained through the capability matching procedure S420 and the multimedia stream information that the first source device 100 supports.

The first source device 100 transmits the stream end point information matched by the capability matching procedure S420 and detailed information about the matched multimedia codec to the sink device 200 through the stream configuration procedure S430.

Afterwards, both of the first source device 100 and the sink device 200 enter an open state through a stream establishment procedure S440, and a streaming channel through which a multimedia stream can be transmitted and received in real-time is established.

After the streaming channel is established, the first source device 100 or the sink device 200 carry out a stream start procedure S450 to play a multimedia stream.

After the stream start procedure S450 is carried out, the first source device transmits a multimedia stream to the sink device 200 through a stream release procedure S460 to play multimedia content.

Through the procedure above, the first source device 100 can play multimedia streams through the sink device 200.

In what follows, each individual procedure will be described in more detail.

Stream End Point Discovery Procedure, S410

Figure 5:
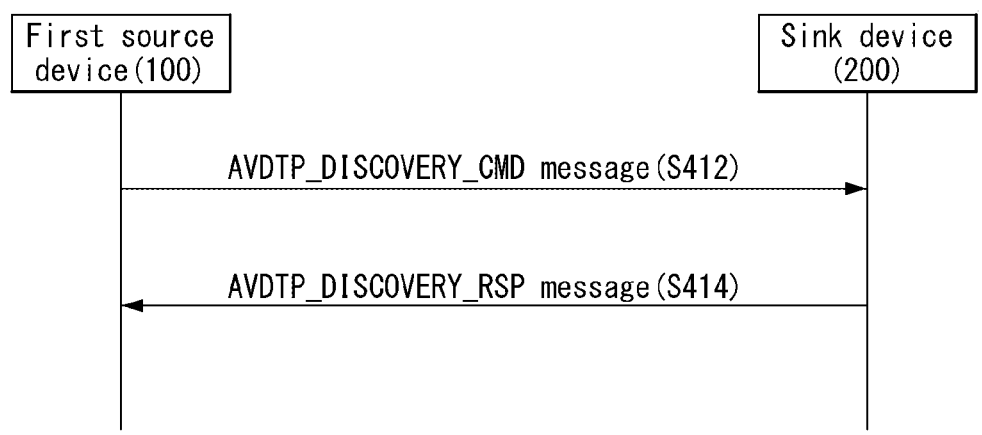
FIG. 5 illustrates one example of a stream end point discovery procedure.

FIG. 5 illustrates one example of a stream end point discovery procedure.

The stream end point discovery procedure S410 is a procedure for obtaining information about which stream system the sink device 200 responds to.

At this time, the stream end point may represent a transmission service or an audio/video service that an electronic device can support through Bluetooth communication.

The first source device 100 transmits an AVDTP discovery command (AVDTP_Discovery_CMD) message to the sink device 200 to obtain the stream end point information of the sink device 200.

Table 1 illustrates one example of the AVDTP discovery command message format.

TABLE 1

| 7 | 6 | 5 | 4 | 3 | 2 | 1 | 0 | Octet |
|---|---|---|---|---|---|---|---|---|
| Transaction Label | | | | Packet Type | | Message Type | | 0 |
| RFA | | | | AVDTP_DISCOVER | | | | 1 |

The Transaction Label field of Table 1 is used to identify the message.

The AVDTP_DISCOVER field is used to represent a signal identifier.

More specifically, the AVDTP_DISCOVER field is used to indicate which function the message carries out, namely, message type and takes the binary value as shown in Table 2 below.

TABLE 2

| Signal Identifier | Value |
|---|---|
| Reserved | 00x0 |
| AVDTP_DISCOVER | 0x01 |
| AVDTP_GET_CAPABILITIES | 0x02 |
| AVDTP_SET_CONFIGURATION | 0x03 |
| AVDTP_GET_CONFIGURATION | 0x04 |
| AVDTP_RECONFIGURE | 0x05 |
| AVDTP_OPEN | 0x06 |
| AVDTP_START | 0x07 |
| AVDTP_CLOSE | 0x08 |
| AVDTP_SUSPEND | 0x09 |
| AVDTP_ABORT | 0x0A |
| AVDTP_SECURITY_CONTROL | 0x0B |
| AVDTP_GET_ALL_CAPABILITIES | 0x0C |
| AVDTP_DELAYREPORT | 0x0D |

With reference to Table 2, the AVDTP_DISCOVER takes the value of 0x01.

Packet Type indicates whether the message consists of a single packet or multi-packets.

Table 3 illustrates one example of information that can be included in the Packet Type.

TABLE 3

| 2 Bit | | |
|---|---|---|
| 3 | 2 | |
| 0 | 0 | Single Packet |
| 0 | 1 | Start Packet |
| 1 | 0 | Continue Packet |
| 1 | 1 | End Packet |

Message Type can include information about a command message or information about a result of the command message.

Table 4 illustrates one example of information that can be included in the Message Type.

TABLE 4

| 2 Bit | | |
|---|---|---|
| 1 | 0 | |
| 0 | 0 | Command |
| 0 | 1 | General Reject |
| 1 | 0 | Response Accept |
| 1 | 1 | Response Reject |

The sink device 200 which has received the AVDTP discovery command message can transmit an AVDTP discovery response (AVDTP_DISCOVERY_RSP) message to the first source device 100 in response to the AVDTP discovery command message.

The AVDTP discovery response message includes information about the stream end point of the sink device 200, namely, information about which stream system the sink device 200 responds to.

Table 5 illustrates one example of the AVDTP discovery response message format.

TABLE 5

| 7 | 6 | 5 | 4 | 3 | 2 | 1 | 0 | Octet |
|---|---|---|---|---|---|---|---|---|
| Transaction Label | | | | Packet Type | | Message Type | | 0 |
| RFA | | | | AVDTP_DISCOVER | | | | 1 |
| First ACP SEID | | | | | | In Use | RFA | 2 |
| Media Type | | | | TSEP | | RFA | | 3 |
| [Other ACP SEID Information (2 Octet each)] | | | | | | | | ... |

First ACP SEID includes information about the unique identifier of the ACP Stream End Point (SEP) and takes a binary value. The First ACP SEID can have the following values.

0x00: Forbidden

0x01-0x3e: valid Stream End Point Identifier (SEID) value

0x3F: RFD

In Use indicates whether an SEP is currently in use, where 0 indicates that the SEP is currently not used and 1 indicates that the SEP is currently in use.

TSEP (Stream End Point Type, Source or Sink) indicates whether the SEP is a source device or a sink device. Here, 0 represents a source device, while 1 represents a sink device.

The source device can obtain information about the Stream End Point (SEP) of the sink device 200 through the AVDTP discovery response message.

In what follows, the capability matching procedure S420 will be described in detail.

Capability Matching Procedure, S420

Figure 6:
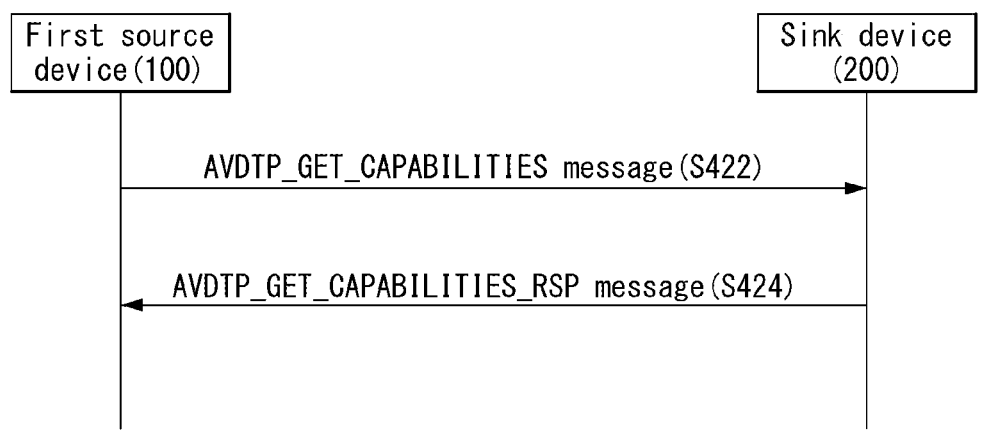
FIG. 6 illustrates one example of a capability matching procedure.

FIG. 6 illustrates one example of a capability matching procedure.

After obtaining information about the SEP of the sink device 200 through the stream end point discovery procedure S410, the first source device 100 can obtain detailed information about a multimedia stream that the sink device 200 supports through the capability matching procedure S420 and match the obtained information to the information of the stream end point that the first source device 100 supports.

With reference to FIG. 6, the first source device 100 can transmit an AVDTP get capability command (AVDTP_GET_CAPABILITIES) message to the sink device 200 to request detailed information about the multimedia streams that the sink device 200 supports S422.

Table 6 illustrates one example of a data format of the AVDTP_GET_CAPABILITIES message.

TABLE 6

| 7 | 6 | 5 | 4 | 3 | 2 | 1 | 0 | Octet |
|---|---|---|---|---|---|---|---|---|
| Transaction Label | | | | Packet Type | | Message Type | | 0 |
| RFA | | | | | AVDTP_GET_CAPABILITIES | | | 1 |
| ACP SEID | | | | | | RFA | | 2 |

AVDTP_GET_CAPABILITIES field represents a signal identifier.

More specifically, the AVDTP_GET_CAPABILITIES field is used to indicate which function the message carries out, namely, message type and takes the binary value as shown in Table 2 above.

The sink device 200, which has received the AVDTP_GET_CAPABILITIES message from the first source device 100 can transmit an AVDTP get capability response (AVDTP_GET_CAPABILITIES_RSP) message to the first source device 100 in response to the AVDTP_GET_CAPABILITIES message S424.

Table 7 illustrates one example of a data format of the AVDTP_GET_CAPABILITIES_RSP message.

TABLE 7

| 7 | 6 | 5 | 4 | 3 | 2 | 1 | 0 | Octet |
|---|---|---|---|---|---|---|---|---|
| Transaction Label | | | | Packet Type | | Message Type | | 0 |
| RFA | | | | | AVDTP_GET_CAPABILITIES | | | 1 |
| Service Category | | | | | | | | 2 |
| Length Of Service Capabilities(LOSC) | | | | | | | | 3 |
| Media Type | | | | | RFA | | | 4 |
| Media Codec Type | | | | | | | | 5 |
| Media Codec Specific Information Elements | | | | | | | | ... |

Through the AVDTP_GET_CAPABILITIES_RSP message, the first source device can know which stream system the sink device 200 responds to, supported media type, and media codec type.

Service Category field indicates which category the service provided by the AVDTP_GET_CAPABILITIES_RSP message belongs to.

Table 8 illustrates one example of binary values that can be included in the Service Category field according to each service type.

TABLE 8

| Bit | | | | | | | | Basic Capability |
|---|---|---|---|---|---|---|---|---|
| 7 | 6 | 5 | 4 | 3 | 2 | 1 | 0 | |
| 0 | 0 | 0 | 0 | 0 | 0 | 0 | 1 | x Media Transport |
| 0 | 0 | 0 | 0 | 0 | 0 | 1 | 0 | x Reporting |
| 0 | 0 | 0 | 0 | 0 | 0 | 1 | 1 | x Recovery |
| 0 | 0 | 0 | 0 | 0 | 1 | 0 | 0 | x Content Protection |
| 0 | 0 | 0 | 0 | 0 | 1 | 0 | 1 | x Header Compression |
| 0 | 0 | 0 | 0 | 0 | 1 | 1 | 0 | x Multiplexing |
| 0 | 0 | 0 | 0 | 0 | 1 | 1 | 1 | x Media Codec |
| 0 | 0 | 0 | 0 | 1 | 0 | 0 | 0 | Delay Reporting |
| Other Values | | | | | | | | RFD |

According to Table 8, the Service Category of the AVDTP_GET_CAPABILITIES_RSP message can have a value representing media codec.

Length Of Service Capabilities (LOSC) field represents the length of Service Capabilities.

Media Type and Media Codec Type field include information about media type and media codec type that the sink device 200 can support, respectively.

The media type that can be supported includes audio, video, and multimedia type.

The Media Codec Type includes information about codec according to the media type that can be supported. More specifically, if the media type is audio type, the Media Codec Type can include information about audio codec that can be supported by the sink device 200; in the case of video type, information about video codec; and in the case of multimedia type, information about multimedia codec. Examples of the audio codec include SBC, MPEC-1, 2 Audio, MPEG-2, 4 AAC, and ATRAC family; and examples of video codec can include H.263 and MPEG-4.

The first source device 100 matches detailed information obtained through the GET_CAPABILITIES_RSP message to the SEP information that the first source device 100 supports.

Stream Configuration Procedure, S430

Figure 7:
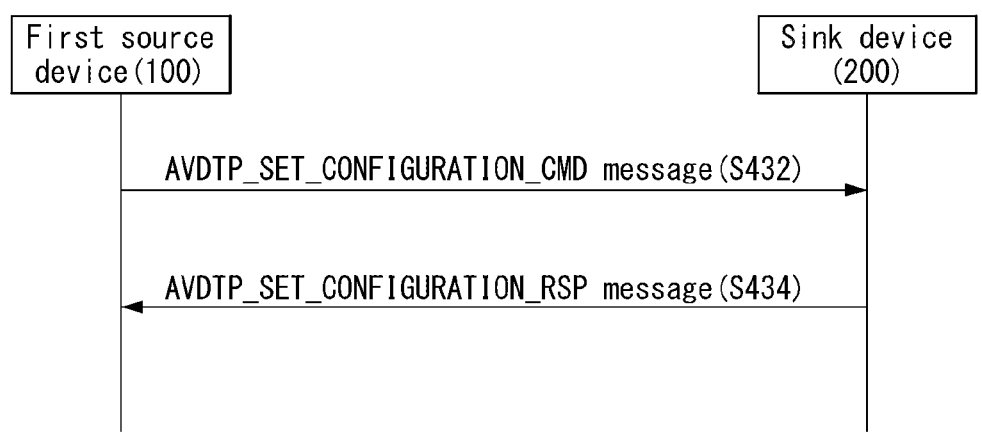
FIG. 7 illustrates one example of a stream configuration procedure.

FIG. 7 illustrates one example of a stream configuration procedure.

The first source device 100 transmits the detailed information about the SEP and the multimedia codec matched in the capability matching procedure to the sink device 200 through the stream configuration procedure S430.

With reference to FIG. 7, the first source device 100 transmits the detailed information about the matched SEP and the matched multimedia codec to the sink device 200 through an AVDTP set configure command (AVDTP_SET_CONFIGURATION_CMD) message S432.

Table 9 illustrates one example of a data format for the AVDTP_SET_CONFIGURATION_CMD message.

TABLE 9

| 7 | 6 | 5 | 4 | 3 | 2 | 1 | 0 | Octet |
|---|---|---|---|---|---|---|---|---|
| Transaction Label | | | | Packet Type | | Message Type | | 0 |
| RFA | | | | | AVDTP_SET_CONFIGURATION | | | 1 |
| ACP SEID | | | | | | RFA | | 2 |
| INT SEID | | | | | | RFA | | 3 |
| Service Capabilities | | | | | | | | ... |

AVDTP_SET_CONFIGURATION field represents a signal identifier.

More specifically, the AVDTP_SET_CONFIGURATION field is used to indicate which function the message carries out, namely, message type and takes the binary value as shown in Table 2 above.

The INT SEID field carries information about the unique identifier of INT SED and takes a binary value.

Service Capabilities Field includes values representing services that can be provided by an SEP.

The sink device 200 which has received the AVDTP_SET_CONFIGURATION_CMD message transmits an AVDTP set configuration response (AVDTP_SET_CONFIGURATION RSP) message to the first source device 100, S434.

Table 10 illustrates one example of a data format for the AVDTP_SET_CONFIGURATION RSP message.

TABLE 10

| 7 | 6 | 5 | 4 | 3 | 2 | 1 | 0 | Octet |
|---|---|---|---|---|---|---|---|---|
| Transaction Label | | | | Packet Type | | Message Type | | 0 |
| RFA | | | | AVDTP_SET_CONFIGURATION | | | | 1 |

Stream Establishment Procedure, S440

Figure 8:
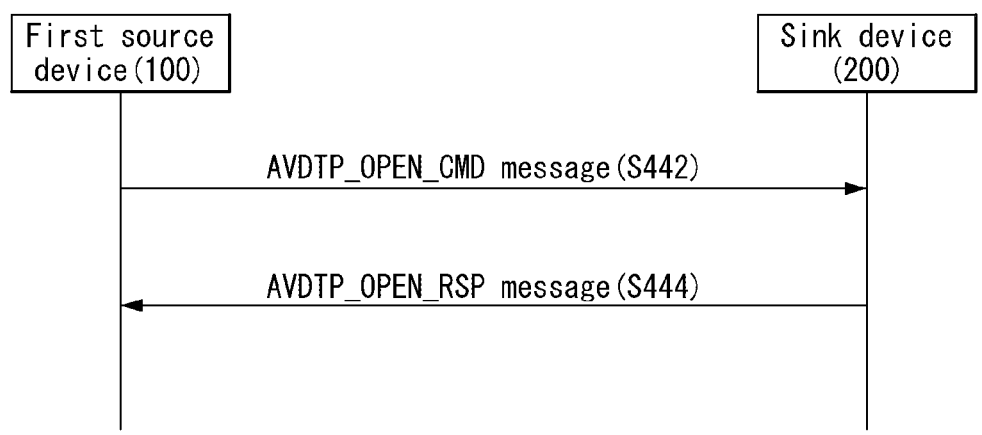
FIG. 8 illustrates one example of a stream establishment procedure.

FIG. 8 illustrates one example of a stream establishment procedure.

Both of the first source device 100 and the sink device 200 enter an open state through the stream establishment procedure S440, and a streaming channel through which a multimedia stream can be transmitted and received in real-time is established.

With reference to FIG. 8, the first source device transmits an AVDTP open command (AVDTP_OPEN_CMD) message to the sink device 200 to establish a streaming channel connection S442.

Table 11 illustrates one example of a data format for the AVDTP_OPEN_CMD message.

TABLE 11

| 7 | 6 | 5 | 4 | 3 | 2 | 1 | 0 | Octet |
|---|---|---|---|---|---|---|---|---|
| Transaction Label | | | | Packet Type | | Message Type | | 0 |
| RFA | | | | AVDTP_OPEN | | | | 1 |
| | | ACP SEID | | | | RFA | | 2 |

AVDTP_OPEN field represents a signal identifier.

More specifically, the AVDTP_OPEN field is used to indicate which function the message carries out, namely, message type and takes the binary value as shown in Table 2 above.

The sink device 200 which has received the AVDTP_OPEN_CMD message transmits an AVDTP open command response (AVDTP_OPEN RSP) message to the first source device 100 in response to the AVDTP_OPEN_CMD message S444.

Table 12 illustrates one example of a data format for the AVDTP_OPEN_CMD message.

TABLE 12

| 7 | 6 | 5 | 4 | 3 | 2 | 1 | 0 | Octet |
|---|---|---|---|---|---|---|---|---|
| Transaction Label | | | | Packet Type | | Message Type | | 0 |
| RFA | | | | AVDTP_OPEN | | | | 1 |

The first source device which has received the AVDTP_OPEN_CMD message can connect the sink device to a streaming channel for multimedia streams.

Stream Start Procedure, S450

Figure 9:
FIG. 9 illustrates one example of a stream start procedure.

FIG. 9 illustrates one example of a stream start procedure.

The sink device 200 which has connected to the streaming channel prepares for receiving multimedia streams transmitted from the first source device 100.

With reference to FIG. 9, the first source device 100 transmits an AVDTP start command (AVDTP_START_COMMAND) message to the sink device 200 to transmit the multimedia stream to the sink device 200 through the connected streaming channel S452.

Table 13 illustrates one example of a data format for the AVDTP_START_COMMAND message.

TABLE 13

| 7 | 6 | 5 | 4 | 3 | 2 | 1 | 0 | Octet |
|---|---|---|---|---|---|---|---|---|
| Transaction Label | | | | Packet Type | | Message Type | | 0 |
| RFA | | | | AVDTP_START | | | | 1 |
| | | FIRST ACP SEID | | | | RFA | | 2 |
| | | [Other ACP SEIDs] | | | | RFA | | ... |

AVDTP_START field represents a signal identifier.

More specifically, the AVDTP_START field is used to indicate which function the message carries out, namely, message type and takes the binary value as shown in Table 2 above.

The sink device 200 transmits an AVDTP start response (AVDTP_START_RSP) message to the first source device 100 in response to the AVDTP_START_COMMAND message S454.

Table 14 illustrates one example of a data format for the AVDTP_START_RSP message.

TABLE 14

| 7 | 6 | 5 | 4 | 3 | 2 | 1 | 0 | Octet |
|---|---|---|---|---|---|---|---|---|
| Transaction Label | | | | Packet Type | | Message Type | | 0 |
| RFA | | | | AVDTP_START | | | | 1 |

The sink device 200 which has transmitted the AVDTP_START_RSP message can play multimedia content by receiving multimedia streams from the first source device.

Through the process described above, a source device can play multimedia streams through a sink device. However, in case the method as described above is used, if multiple source devices attempt to use one sink device, the user has to manually release connection of the source device from the sink device and re-establish a new source device connection.

Therefore, described below will be a method for transition of control when multiple source devices attempt to play a multimedia stream through one sink device as a solution to the aforementioned inconvenience.

Figure 10:
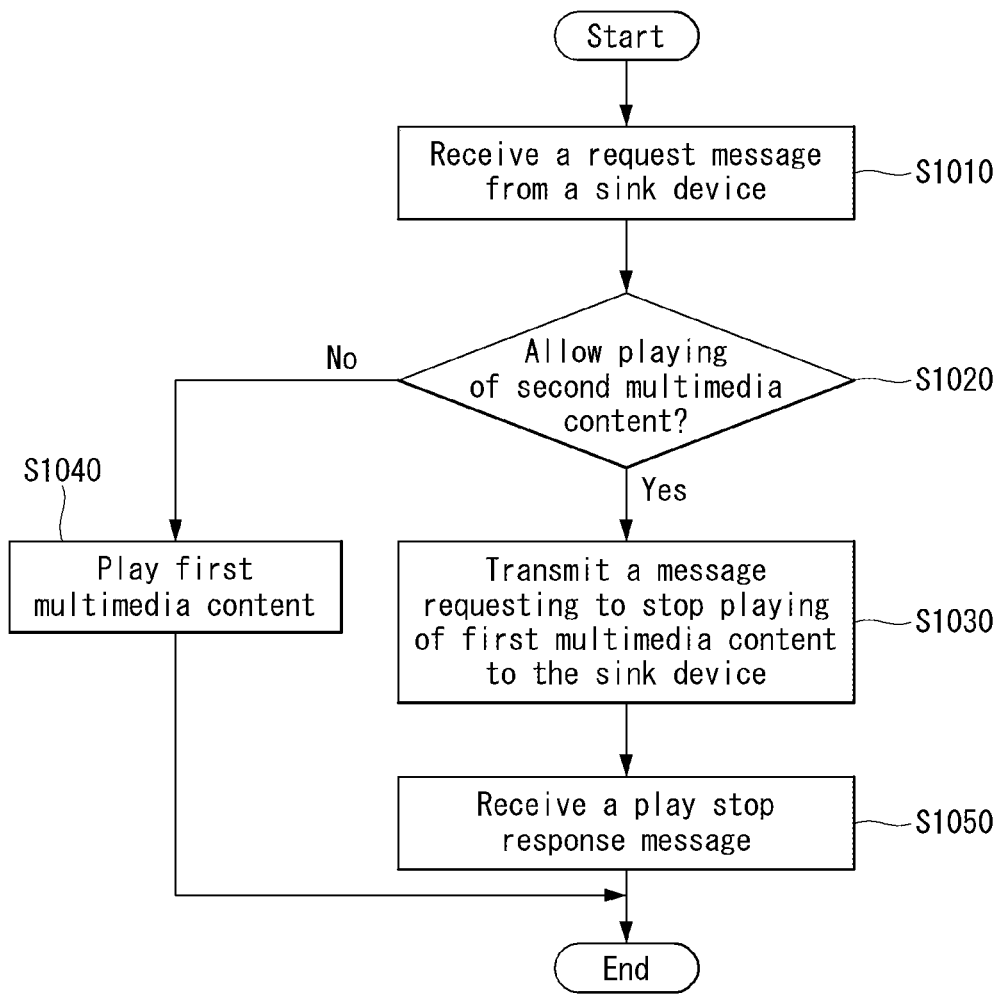
FIG. 10 illustrates one example of a procedure of carrying out a method for playing multimedia content by a first source device according to the present invention.

FIG. 10 illustrates one example of a procedure of carrying out a method for playing multimedia content by a first source device according to the present invention.

The first source device which is now playing a multimedia stream through a sink device can determine whether to allow a second source device to play multimedia content in case the second source device attempts to play the corresponding multimedia stream through a connection to the sink device.

More specifically, in case the second source device attempts to play a multimedia stream through the sink device, the first source device can receive a request message inquiring whether to allow the attempt from the sink device S1010.

The first source device which has received the request message can determine whether to allow the second source device to play second multimedia content S1020.

Whether to allow playing of the second multimedia content can be determined by a signal received by the first source device from the user or by the priorities of the first and the second source device.

In case the first source device does not allow the second source device to play the second multimedia content, the first source device can continuously play the first multimedia content through the sink device S1040.

However, in case the first source device allows the second source device to play the second multimedia content, the first source device can transmit a message requesting to stop playing of the first multimedia content to the sink device S1030.

After transmitting the message requesting to stop playing of the first multimedia content, the first source device can receive a play stop response message with respect to the first multimedia content from the sink device in response to the request message S1050.

Through this operation, the sink device stops playing the first multimedia content and plays the second multimedia content of the second source device.

Through the procedure described above, the present invention can smoothly carry out a streaming procedure for a new source device even if another source device has already occupied the sink device to play its multimedia content.

Also, even if the user does not release an existing connection to the previous source device and establish a connection for a new source device, the present invention can allow the new source device to play multimedia content.

Figure 11A:
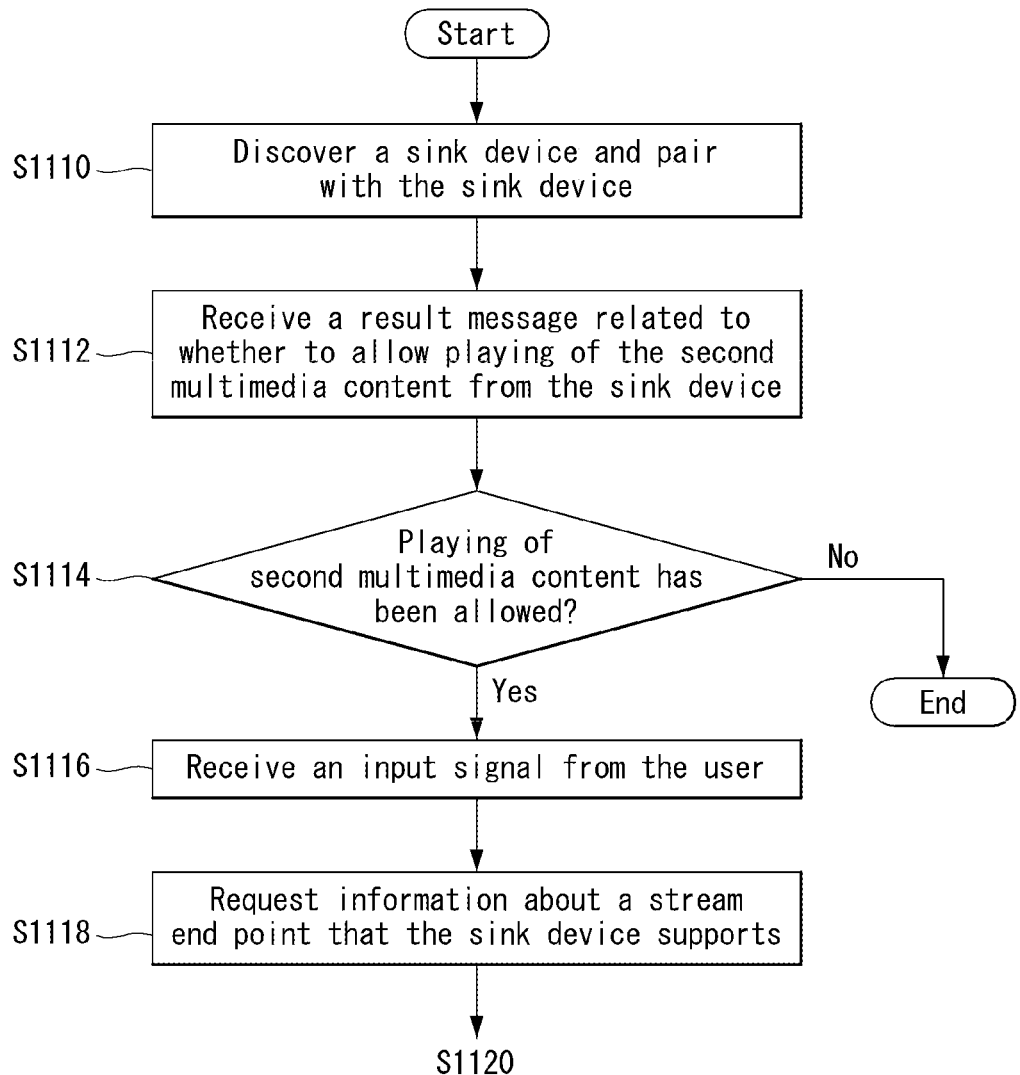

FIGS. 11a and 11b illustrate a procedure of carrying out a method for playing multimedia content by a second source device according to the present invention.

While a sink device is already playing first multimedia content of a first source device, the second source device can play the second multimedia content according to whether the first source device or the sink device is allowed to play multimedia content.

With reference to FIGS. 11a and 11b, in case the second source device discovers the sink device through Bluetooth communication, the second source device can establish pairing with the sink device to play the second multimedia content stored in the second source device S1110.

After the pairing procedure is completed, the second source device can receive a result message related to whether to allow playing of the second multimedia content from the sink device S1112.

Whether to allow playing of the second multimedia content can be determined by a signal received by the sink device or the first source device from the user; or by the priority calculated on the basis of parameters transmitted to the sink device by the first and the second source device.

The second source device which has received the result message can check whether playing of the second multimedia content has been allowed on the basis of the information included in the result message S1114.

In case the information included in the result message indicates that playing of the second multimedia content is not allowed, the procedure is terminated, and the second source device can start searing for another sink device through which the second source device can play multimedia content.

However, in case the information included in the result message indicates that playing of the second multimedia content is allowed, the second source device can receive a playing-related input signal from the user S1116.

The second source device which has received an input signal from the user requests information about a Stream End Point (SEP) that the sink device supports from the sink device S1118.

The second source device receives from the sink device information about the SEP that the sink device supports in response to the request S1120.

Based on the received information, the second source device can request from the sink device detailed information about the SEP that the sink device supports S1122 and receive from the sink device detailed information about the SEP that the sink device supports in response to the request S1124.

The second source device can determine whether it has received detailed information about all of the SEPs that the sink device supports S1126.

If it is determined that the second source device has failed to receive detailed information about all of the SEPs, the second source device can receive information back from the S1122 step, whereas in case the second source device determines that it has received detailed information about all of the SEPs, an SEP of the sink device which matches the SEP of the second source device is selected S1128.

The second source device which has selected a matched SEP can play the second multimedia content through the sink device S1130.

According to the present invention, the first and the second source device can play multimedia content through the same sink device.

Also, the user can stop playing the first multimedia content of the first source device without carrying out a separate procedure of releasing the first source device and play the second multimedia content of the second source device.

By using the method above, users can enjoy convenience and simplicity in an environment where a plurality of source devices are competing for one sink device, thereby increasing user experience.

Figure 12:
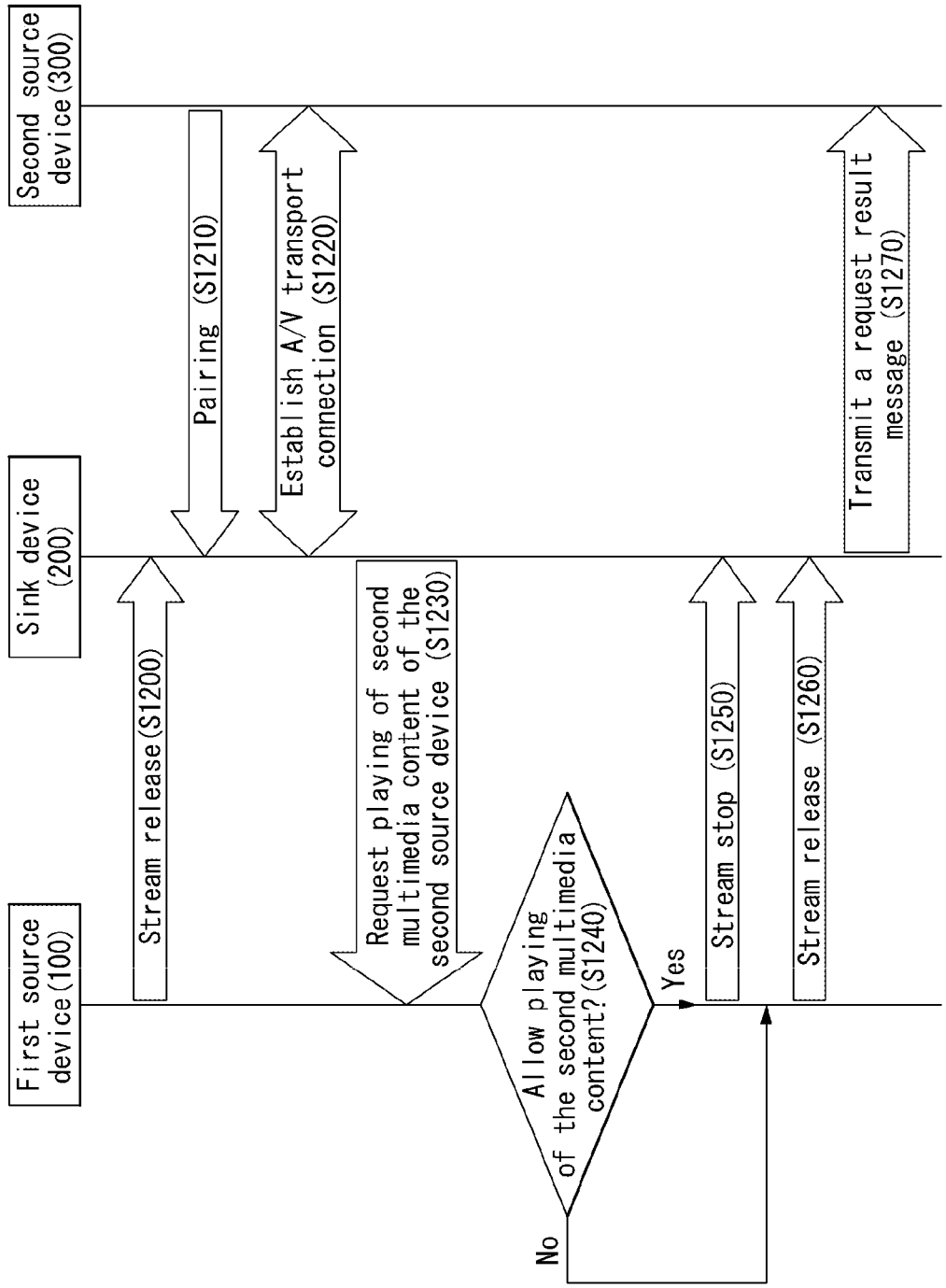
FIG. 12 is a flow diagram illustrating one example of a procedure of playing multimedia content according to the present invention.

FIG. 12 is a flow diagram illustrating one example of a procedure of playing multimedia content according to the present invention.

The first source device 100 playing first multimedia content through a sink device can determine whether to allow the second source device 300 to play second multimedia content through the sink device 100.

With reference to FIG. 12, the first source device 100 transmits a first multimedia stream to the sink device 200, and the sink device plays the first multimedia stream received from the first source device S1200.

At this time, the second source device 300 can establish pairing with the sink device to play its second multimedia content S1210.

The second source device 300 which has paired with the sink device can establish A/V transport connection to the sink device 200 to play the second multimedia content S1220.

The sink device 200 which has paired with the second source device transmits a message inquiring whether to allow playing of the second multimedia content to the first source device S1230.

Afterwards, the first source device 100 can determine whether to allow the sink device 200 to play the second multimedia content S1240.

In case the first source device 100 allows playing of the second multimedia content on the basis of the determination result, the first source device can stop playing of the sink device 200 and the first multimedia stream being played S1250.

At this time, the first source device 100 can release all of the resources and transport channels allocated for streaming and enter an idle state.

In case the first source device 100 receives a play signal again from the user while in the idle state, the first source device 100 can leave the idle state and again play the first multimedia stream through the sink device.

In this case, the second source device can enter the idle state on the contrary to the first source device and release all of the resources and transport channels allocated for streaming.

Through the state change as above, the first and the second source device can reduced power consumption.

However, in case the first source device 100 does not allow playing of the second multimedia content, the first source device can continuously play the first multimedia stream through the sink device 200, S1260.

The sink device 200 can transmit the determination result (permission or prohibition) to the second source device S1270.

In case the received determination result indicates permission, the second source device can play the second multimedia content through the sink device 200, whereas in the case of prohibition, the procedure in conjunction with the sink device 200 is terminated, and the second source device searches for another sink device.

Figure 13:
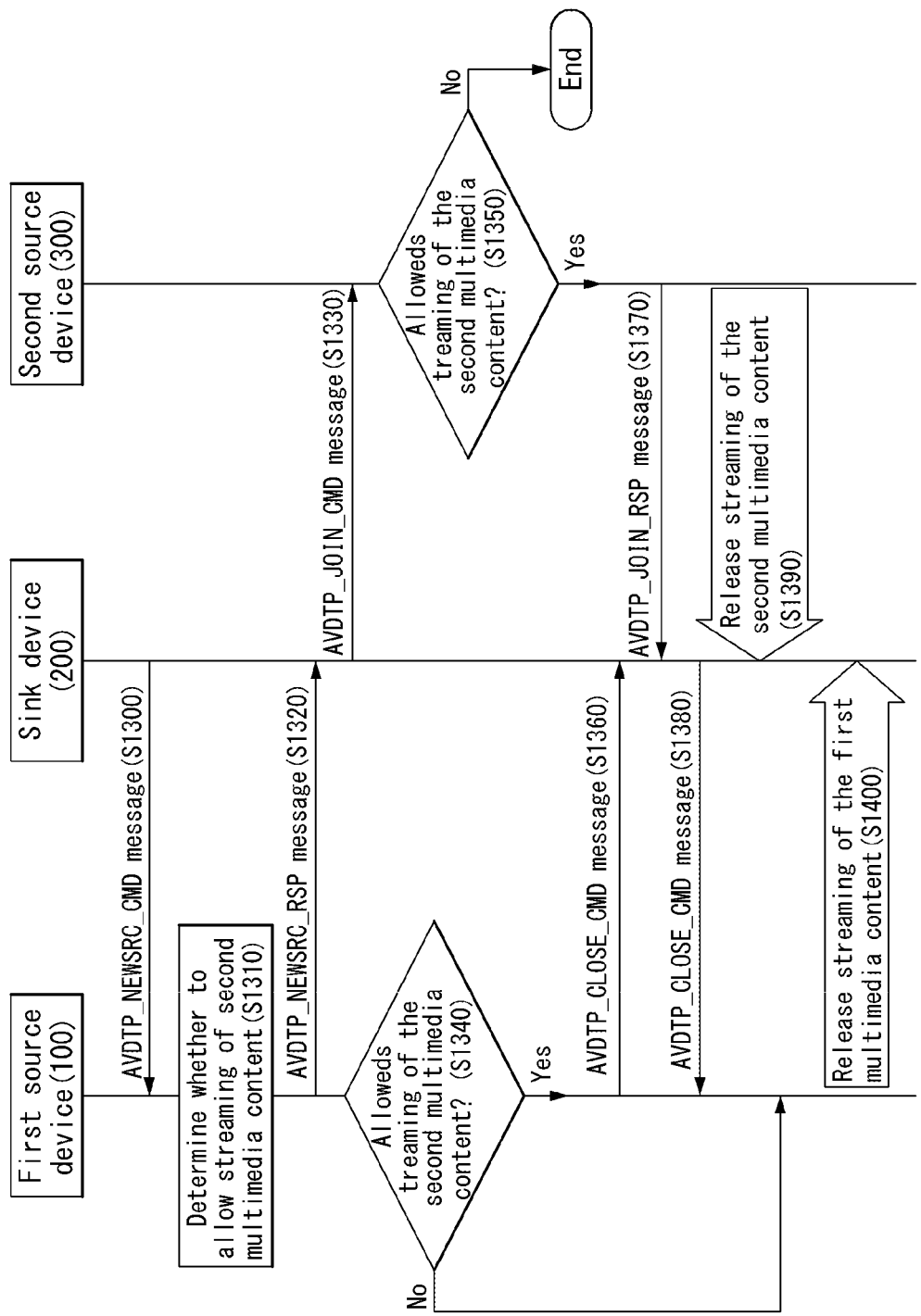
FIG. 13 is a flow diagram illustrating another example of a procedure of playing multimedia content according to the present invention.
Figure 14:
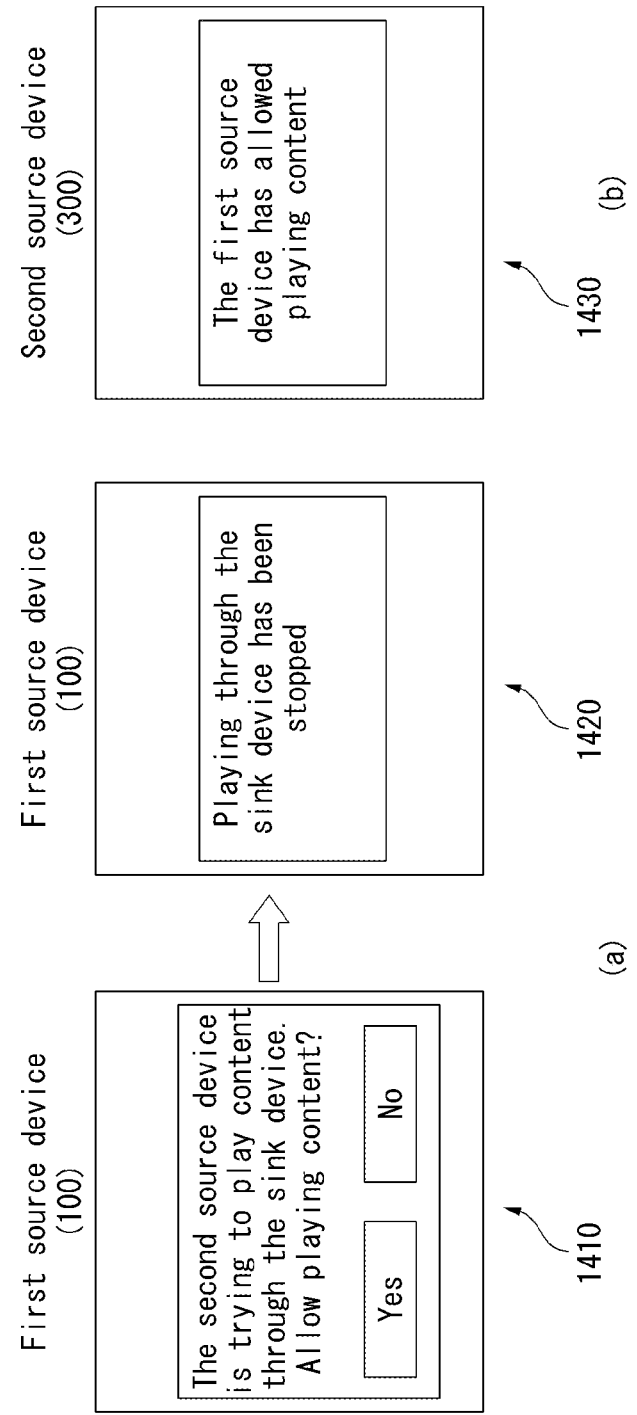
FIG. 14 illustrates one example of a message provided by a device to a user according to the present invention.

FIG. 13 is a flow diagram illustrating another example of a procedure of playing multimedia content according to the present invention, and FIG. 14 illustrates one example of a message provided by a device to a user according to the present invention.

With reference to FIGS. 13 and 14, one can find messages related to the procedure illustrated in FIG. 12; or a frame transmission scheme and a form of message displayed in the user terminal.

More specifically, while the first source device 100 is playing first multimedia content through the sink device 200 by using a Bluetooth streaming service, the second source device 300 can pair with the sink device 200 and establish an A/V transport connection to play the second multimedia content.

In this case, the sink device 200 can transmit the AVDTP request (AVDTP_NEWSRC_CMD) message for determining whether to allow playing of the second multimedia content to the first source device 100 which is currently playing the first multimedia stream S1300.

Table 15 illustrates one example of a data format for the AVDTP_NEWSRC_CMD message.

TABLE 15

| 7 | 6 | 5 | 4 | 3 | 2 | 1 | 0 | Octet |
|---|---|---|---|---|---|---|---|---|
| Transaction Label | | | | Packet Type | | Message Type | | 0 |
| RFA | | | | AVDTP_NEWDRC | | | | 1 |
| User-friendly Name of New Source Device | | | | | | | | ... |

AVDTP_NEWSRC field represents a signal identifier.

More specifically, the AVDTP_NEWSRC field is used to indicate which function the message carries out, namely, message type and takes the binary value as shown in Table 2 above.

Although specific values for signal identifiers of the respective messages are shown in Table 2, the AVDTP_NEWSRC value is not shown in Table 2.

Therefore, a binary value 0x0D and beyond can be assigned to the AVDTP_NEWSRC and the assigned value can be included in the AVDTP_NEWSRC field.

User-friendly Name of New Source Device field represents a user-friendly name of a new device obtained at the pairing step (which refers to the second source device 300 in the present invention) and can be replaced with a unique value, Bluetooth Device Address (BD Address or MAC address).

The first source device 100 can receive a signal related to permission to play by displaying a message 1410 related to permission to play the second multimedia content on the display unit and obtaining an input from the user in the form of 'Yes' or 'No'.

The first source device 100 can determine whether to play the second multimedia content through the sink device 200 according to the input signal S1310.

The first source device 100 which has determined to allow playing the second multimedia content can transmit the determination result to the sink device 200 together with an AVDTP response (AVDTP_NEWSRC_RSP) message S1320.

Table 16 illustrates one example of a data format for the AVDTP_NEWSRC_RSP message.

TABLE 16

| 7 | 6 | 5 | 4 | 3 | 2 | 1 | 0 | Octet |
|---|---|---|---|---|---|---|---|---|
| Transaction Label | | | | Packet Type | | Message Type | | 0 |
| RFA | | | | AVDTP_NEWSRC | | | | 1 |

ACCEPT/REJECT field carries information indicating whether the second multimedia content of the newly paired second source device 300 is allowed to be played or not. In case playing of the second multimedia content is allowed, the ACCEPT/REJECT field contains the value of 0x01, and it contains 0x00 if the playing is prohibited.

After receiving the AVDTP_NEWSRC_RSP message, the sink device 200 can transmit an AVDTP result (AVDTP_JOIN_CMD) message which includes information about the result above to the second source device 300, S1330.

The AVDTP_JOIN_CMD message is a message transmitted from the sink device 200 to the second source device 300 and is capable of informing the sink device 200 of whether the newly paired second source device 300 is allowed to play multimedia streams.

Table 17 illustrates one example of a data format for the AVDTP_JOIN_CMD message.

TABLE 17

| 7 | 6 | 5 | 4 | 3 | 2 | 1 | 0 | Octet |
|---|---|---|---|---|---|---|---|---|
| Transaction Label | | | | Packet Type | | Message Type | | 0 |
| RFA | | | | AVDTP_JOIN | | | | 1 |

AVDTP_JOIN field represents a signal identifier.

More specifically, the AVDTP_JOIN field is used to indicate which function the message carries out, namely, message type and takes the binary value as shown in Table 2 above.

Although specific values for signal identifiers of the respective messages are shown in Table 2, the AVDTP_JOIN value is not shown in Table 2.

Therefore, a binary value 0x0D and beyond can be assigned to the AVDTP_JOIN and the assigned value can be included in the AVDTP_JOIN field.

ACCEPT/REJECT field carries information indicating whether the sink device 200 is allowed to play multimedia streams of the newly paired second source device 300.

The ACCEPT/REJECT field can include a binary value and in case streaming of the second source device 300 is allowed, the binary value can be '01', but it is '00' in case the streaming is not allowed.

The first source device 100 can receive a signal related to permission to play the second multimedia content of the second source device 300 from the user's input and determine whether to allow playing the second multimedia content S1340.

In case the user selects 'Yes' from the message 1410 of FIG. 14, it indicates that playing of the second multimedia content is allowed; therefore, the first source device can transmit an AVDTP streaming stop (AVDTP_CLOSE_CMD) message to the sink device 200 to stop playing of the first multimedia content S1360.

Table 18 illustrates one example of a data format for the AVDTP_CLOSE_CMD message.

TABLE 18

| 7 | 6 | 5 | 4 | 3 | 2 | 1 | 0 | Octet |
|---|---|---|---|---|---|---|---|---|
| Transaction Label RFA | | | | Packet Type AVDTP_CLOSE | | Message Type | | 0 1 |
| | | ACP SEID | | | | RFA | | 2 |

AVDTP_CLOSE field represents a signal identifier.

More specifically, the AVDTP_CLOSE field is used to indicate which function the message carries out, namely, message type and takes the binary value as shown in Table 2 above.

The sink device 200 which has received the AVDTP_CLOSE_CMD message transmits an AVDTP streaming stop response (AVDTP_CLOSE_RSP) message to the first source device 100 in response to the AVDTP_CLOSE_CMD message S1380 and stops playing the first multimedia stream.

At this time, a message 1420 notifying that playing of the first multimedia stream has been stopped as shown in FIG. 14 is displayed on the first source device.

Table 19 illustrates one example of a data format for the AVDTP_CLOSE_RSP message.

TABLE 19

| 7 | 6 | 5 | 4 | 3 | 2 | 1 | 0 | Octet |
|---|---|---|---|---|---|---|---|---|
| Transaction Label RFA | | | | Packet Type AVDTP_CLOSE | | Message Type | | 0 1 |

The second source device can determine whether to allow playing of the second multimedia content through the AVDTP_JOIN_CMD message S1350.

If it is determined that playing of the second multimedia content is prohibited, the procedure is terminated, and the second source device 200 searches for another sink device.

In this case, the first source device can continuously play the first multimedia content through the sink device S1400.

However, in case playing of the second multimedia content is allowed, a message 1430 as shown in FIG. 14 is displayed on the second source device, and the second source device 300 can transmit the AVDTP_JOIN_RSP message to the sink device 200 in response to the AVDTP_JOIN_CMD message S1370.

Table 20 illustrates one example of a data format for the AVDTP_JOIN_CMD message.

TABLE 20

| 7 | 6 | 5 | 4 | 3 | 2 | 1 | 0 | Octet |
|---|---|---|---|---|---|---|---|---|
| Transaction Label RFA | | | | Packet Type AVDTP_JOIN | | Message Type | | 0 1 |

The second source device 300 which has transmitted the AVDTP_JOIN_CMD message can play the second multimedia content through the sink device 200 by carrying out a procedure of releasing the second multimedia stream.

Figure 15:
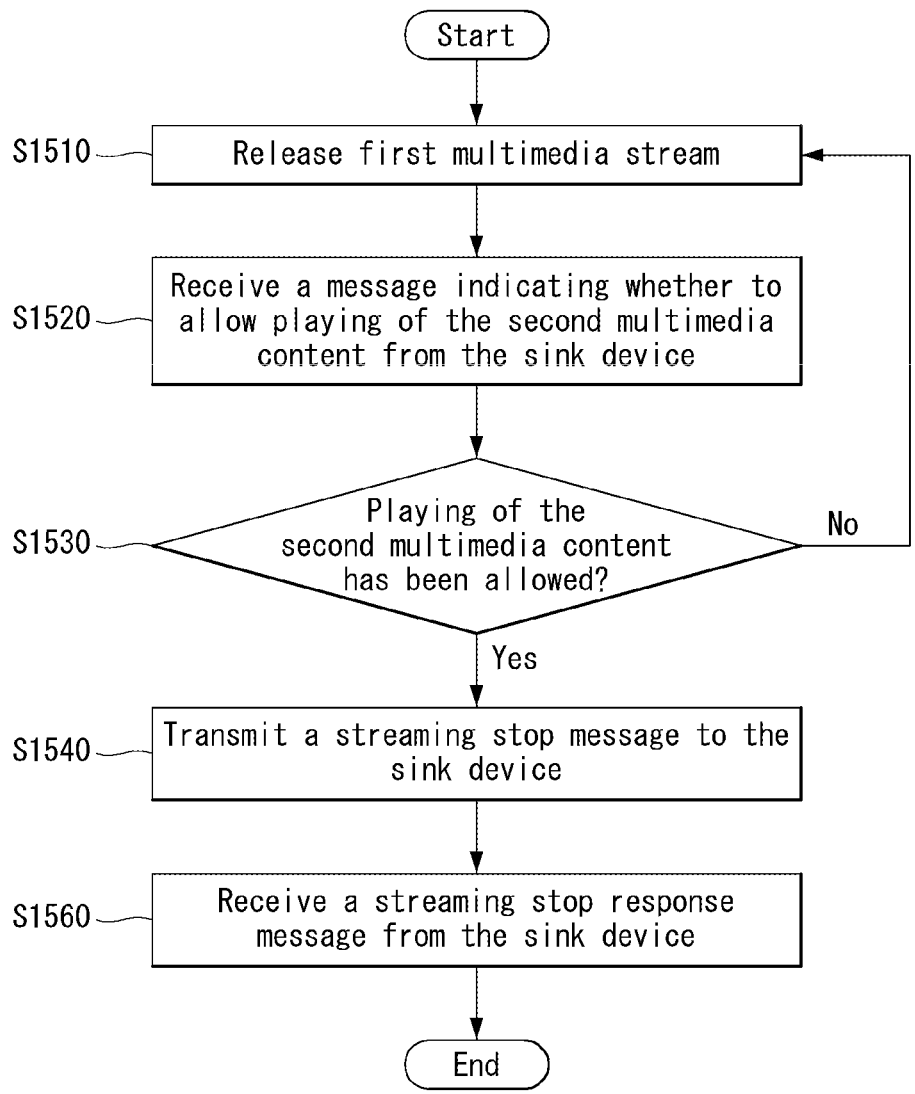
FIG. 15 illustrates another example of a procedure of carrying out a method for playing multimedia content by a first source device according to the present invention.

FIG. 15 illustrates another example of a procedure of carrying out a method for playing multimedia content by a first source device according to the present invention.

According to the present embodiment, different from the embodiments described with reference to FIGS. 10 to 13, a user input is given to the sink device to determine whether to play the second multimedia content stored in the second source device.

More specifically, suppose that the first source device is playing first multimedia content through the sink device S1510.

In case the second source device is paired with the sink device to play the second multimedia content while the first multimedia content is being played, the first source device can receive from the sink device a message indicating whether to allow playing of the second multimedia content S1520.

Whether to allow playing of the second multimedia content is determined on the basis of the user input to the sink device or priorities of the first and the second source device.

The first source device which has received the permission result message can determine whether to allow playing of the second multimedia content of the second source device on the basis of the information included in the permission result message S1530.

In case the sink device does not allow the second source device to play the second multimedia content, the first source device can continuously play the first multimedia content through the sink device S1510.

However, in case the sink device allows playing of the second multimedia content, the first source device can transmit a play stop message for the first multimedia content to the sink device S1540 and receive a play stop response message from the sink device in response to the play stop message S1560.

The play stop message and the play stop response message can have the same structure as the AVDTP_CLOSE_CMD message and the AVDTP_CLOSE_RSP message.

According to the present embodiment, which content to be played through the sink device can be determined, and by controlling the device which directly plays multimedia content, a source device which directly contains multimedia content to be played can be directly selected.

Figure 16:
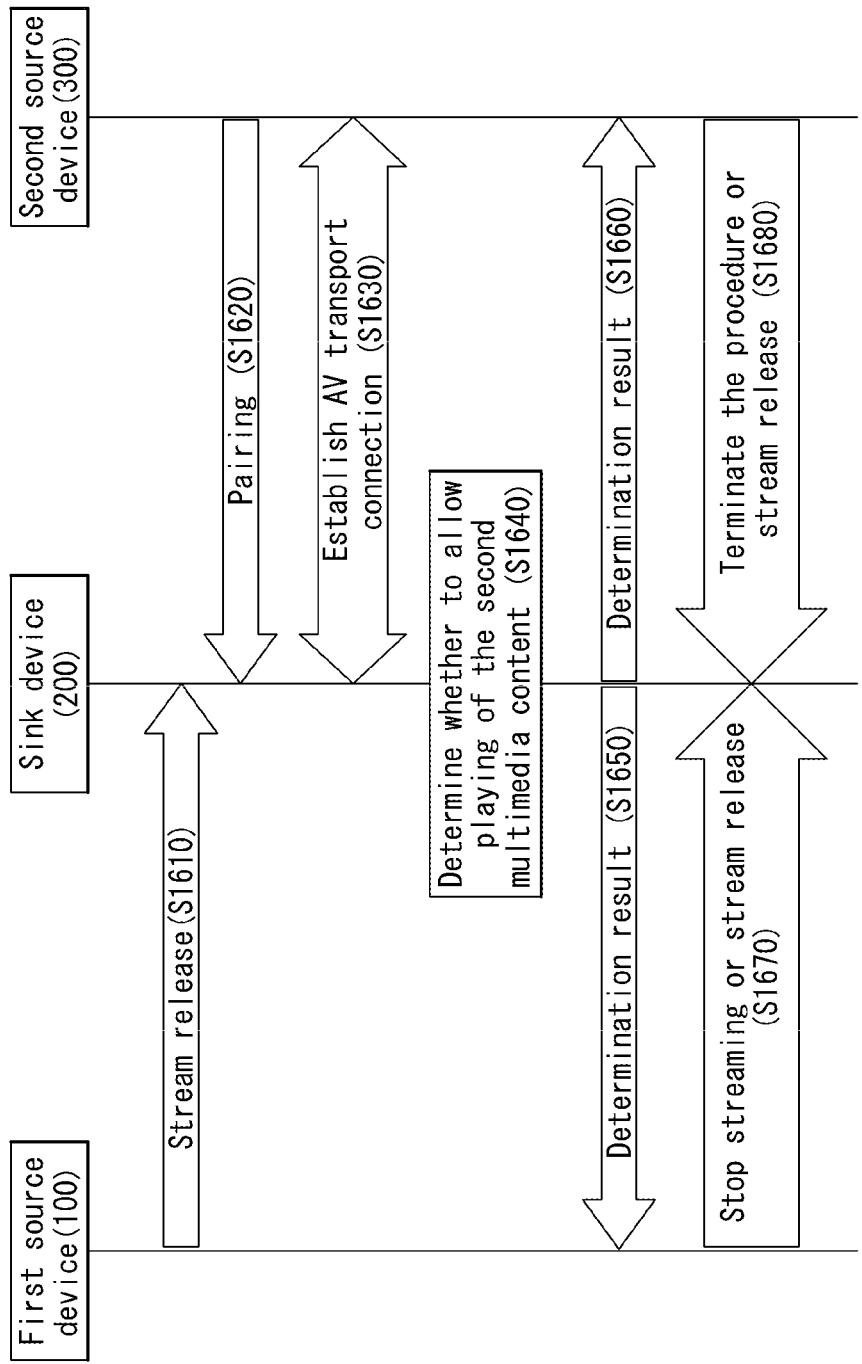
FIG. 16 is a flow diagram illustrating a yet another example of a procedure of playing multimedia content according to the present invention.

FIG. 16 is a flow diagram illustrating a yet another example of a procedure of playing multimedia content according to the present invention.

Since the S1610 to S1630 steps of FIG. 16 are the same as the S1200 to S1220 steps of FIG. 12, the corresponding descriptions are omitted.

With reference to FIG. 16, the sink device 200 can determine whether to play the first multimedia content of the first source device 100 or the second multimedia content of the second source device 300, S1640.

The sink device 200 can determine whether to allow playing of the second multimedia content by receiving an input signal from the user and transmit the determination result to the first 100 and the second source device 300, S1650, S1660.

The first source device which has received the determination result can stop playing of the first multimedia stream according to the determination result or play the first multimedia stream continuously S1670.

Also, the second source device 300 may terminate the procedure without playing the second multimedia content according to the determination result of the sink device 200 or play the second multimedia content through the sink device 200, S1680.

Figure 17:
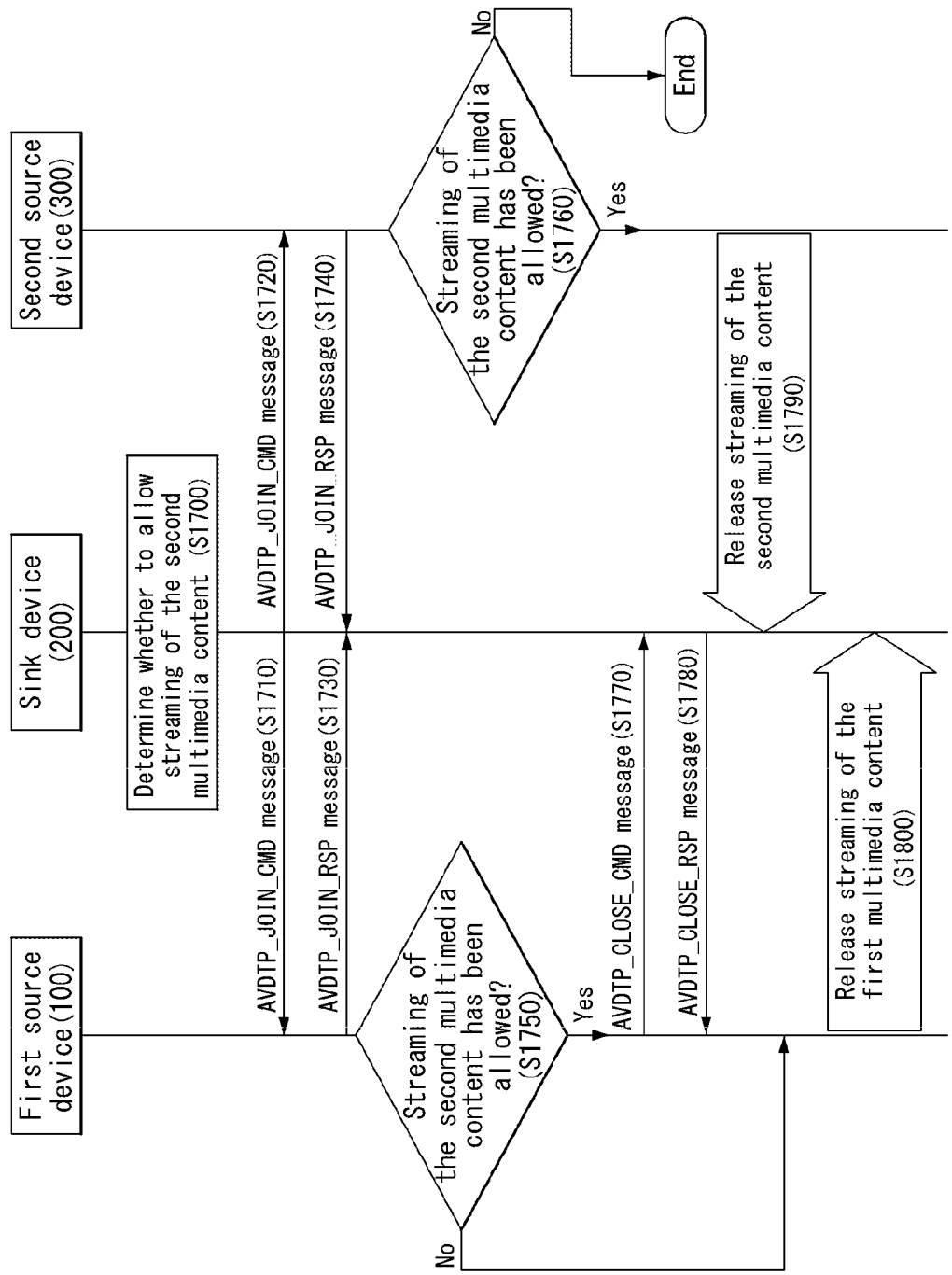
FIG. 17 is a flow diagram illustrating a still another example of a procedure of playing multimedia content according to the present invention.
Figure 18:
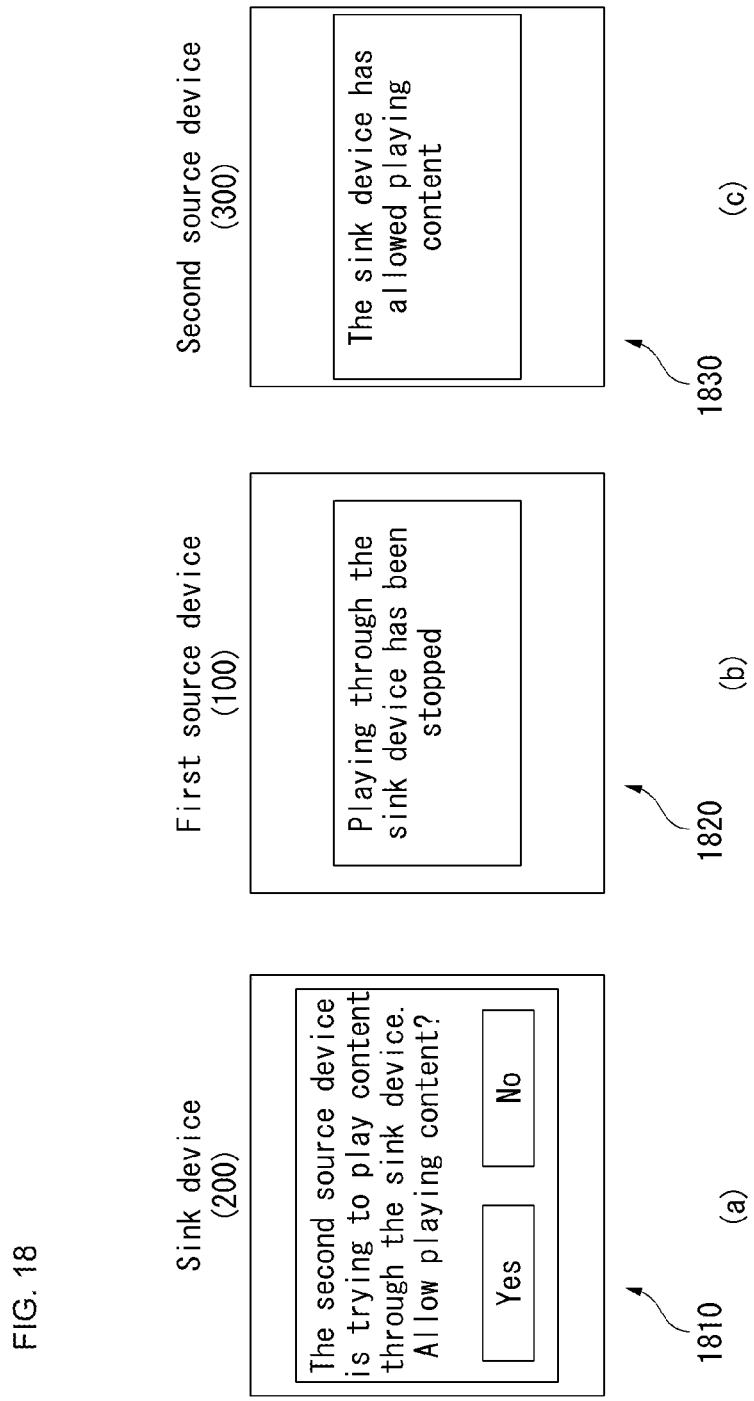
FIG. 18 illustrates another example of a message provided by a device to a user according to the present invention.

FIG. 17 is a flow diagram illustrating a still another example of a procedure of playing multimedia content according to the present invention, and FIG. 18 illustrates another example of a message provided by a device to a user according to the present invention.

With reference to FIGS. 17 and 18, one can find messages related to the procedure illustrated in FIG. 16; or a frame transmission scheme and a form of message displayed in the user terminal.

More specifically, in case the second source device 300 attempts to establish a connection to play the second multimedia content while the first multimedia stream of the first source device 100 is being played, the sink device 200 can determine whether to allow playing of the second multimedia content S1700.

An input signal from the user determines whether to allow playing of the second multimedia content. With reference to FIG. 18, in case the second source device 300 is connected to the sink device, messages 1810 related to the connection is displayed on the sink device 200 (*a*). The user can select 'Yes' or 'No' from the message 1810.

In case a signal is received from the user, the sink device 200 includes the result in the AVDTP_JOIN_CMD message and transmits the message to the first 100 and the second source device 300, S1710, S1720.

The format of the AVDTP_JOIN_CMD message is the same as the structure as described in Table 16 of FIG. 13.

The first 100 and the second source device 200 which have received the AVDTP_JOIN_CMD message can transmit an AVDTP_JOIN_RSP message to the sink device 200, S1730, S1740.

The AVDTP_JOIN_RSP message has the same structure as described in Table 19 of FIG. 13.

The first 100 and the second source device 300 which have received the AVDTP_JOIN_RSP message can determine respectively whether to allow playing multimedia content on the basis of the information included in the AVDTP_JOIN_RSP message S1750, S1760.

If it is determined that playing of the second multimedia content is allowed, the first source device 100 can transmit an AVDTP_CLOSE_CMD message to the sink device 200 to stop playing of the first multimedia content S1770.

Also, the first source device 100 can receive an AVDTP_CLOSE_RSP message from the sink device 200 in response to the AVDTP_CLOSE_CMD message S1780.

In this case, by displaying the message 1820 of FIG. 18 through the output unit, the first source device 100 can inform the user that playing of the first multimedia stream has been stopped.

The AVDTP_CLOSE_CMD message and the AVDTP_CLOSE_RSP message have the same structure as the one illustrated in FIG. 13.

In case the second multimedia content is allowed to be played, the second source device 300 can play the second multimedia content through the sink device S1790.

In this case, by displaying the message 1830 of FIG. 18 through the output unit of the second source device 300, the second source device 300 can inform that the second multimedia content is being played.

However, in case the second multimedia content is not allowed to be played, the first source device 100 can play the first multimedia stream continuously through the sink device 200 S1800, and the procedure of the second source device 300 is terminated.

Figure 19:
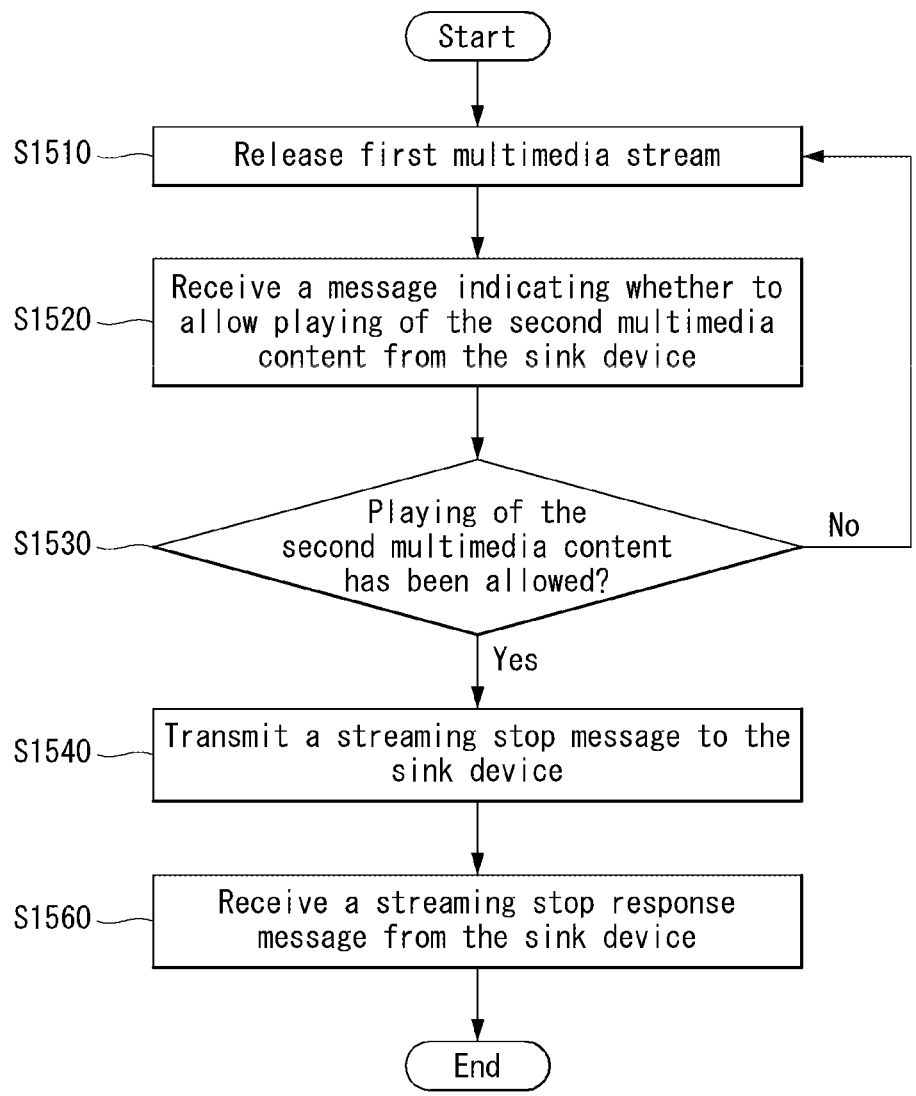
FIG. 19 is a flow diagram illustrating one example of playing multimedia content in order of priority according to the present invention.

FIG. 19 is a flow diagram illustrating one example of playing multimedia content in order of priority according to the present invention.

The sink device 200 receives parameter information from the first 100 and the second source device 300 to determine priorities, determines the order of priority on the basis of the parameter information, and determines which content to play on the basis of the determined order of priority.

More specifically, the sink device 200 can receive an AVDTP information (AVDTP_SRCCAPA_CMD) message from the first 100 and the second source device 200, S1910, S1920.

The AVDTP information message can include various types of parameter information so that the sink device 200 can determine the order of priority.

Table 21 illustrates one example of the parameter information.

TABLE 21

| Parameter | Description |
| --- | --- |
| Remained Energy | An amount of remaining battery in the device (the more the amount of remaining battery, the higher is the parameter) |
| Supplied Power Method | It indicates whether the power is supplied through an adaptor. (In case the power is supplied, the power is set to be higher than the maximum value of the amount of remaining battery) |
| Assigned Computing Resource | Average of computing resources such as CPU and memory currently available (An average value of last t hours) |
| Received Signal Strength Indication (RSSI) | It gives how close a source device is to a sink device calculated on the basis of RSSI. |
| The Number of Connection | The higher the value, the more often used is the corresponding device. |

The parameters are not limited to those shown in Table 21, but more parameter information can be included.

Table 22 illustrates one example of a data format for the AVDTP_SRCCAPA_CMD message.

TABLE 22

| 7 | 6 | 5 | 4 | 3 | 2 | 1 | 0 | Octet |
| --- | --- | --- | --- | --- | --- | --- | --- | --- |
| Transaction Label | | | | Packet Type | | Message Type | | 0 |
| RFA | | | | AVDTP_SRCCAPA | | | | 1 |
| Remained Energy | | | | | | | | 2 |
| Supplied Power Method | | | | | | | | 3 |
| Assigned Computing Resource | | | | | | | | 4 |
| Received Signal Strength Indication(RSSI) | | | | | | | | 5 |
| The Number of Connection | | | | | | | | 6 |

AVDTP_SRCCAPA field represents a signal identifier.

More specifically, the AVDTP_SRCCAPA field is used to indicate which function the message carries out, namely, message type and takes the binary value as shown in Table 2 above.

Although specific values for signal identifiers of the respective messages are shown in Table 2, the AVDTP_SRCCAPA value is not shown in Table 2.

Therefore, a binary value 0x0D and beyond can be assigned to the AVDTP_SRCCAPA and the assigned value can be included in the AVDTP_SRCCAPA field.

The sink device 200 which has obtained parameter information from the first 100 and the second source device 300 can calculate the order of priority for playing multimedia content on the basis of the obtained parameter information and transmit an AVDTP priority (AVDTP_SRCCAPA_RSP) message including the calculated priority to the first 100 and the second source device 300, S1930, S1940.

Table 23 illustrates one examples of a data format of the AVDTP_SRCCAPA_RSP message.

TABLE 23

| 7 | 6 | 5 | 4 | 3 | 2 | 1 | 0 | Octet |
|---|---|---|---|---|---|---|---|---|
| Transaction Label | | | | Packet Type | | Message Type | | 0 |
| RFA | | | | AVDTP_SRCCAPA | | | | 1 |
| Priority information | | | | | | | | 2~N |
| The number of devices to be able to connect | | | | | | | | 3 |

Priority information field represents information about priorities of a previously connected source device and a source device which currently requests a connection.

The number of devices to be able to connect field represents the number of devices that can be connected to the corresponding sink device.

The sink device 200 can determine which multimedia content to play on the basis of the calculated priority value S1950.

Afterwards, since the S1960 to S2050 steps are the same as the S1710 to S1800 steps, the corresponding descriptions are omitted.

Various substitutions, modifications, and changes can be made to the present invention described above by those skilled in the art to which the present invention belongs without leaving the technical scope of the present invention; therefore, the present invention is not limited to the embodiments above and appended drawings.

INDUSTRIAL APPLICABILITY

This document discloses a method and an apparatus for a plurality of source devices to play multimedia content in an efficient manner through one sink device by using a wireless communication technology, Bluetooth.

The invention claimed is:

1. A method for content streaming through a wireless communication system including a plurality of source devices and one sink device, the method comprising:
  receiving a request message related to allowing streaming of second multimedia content of a second source device from the sink device by a first source device streaming first multimedia content, the request message including a parameter information for determining a priority of the second source device;
  determining, by the first source device, whether to allow streaming of the second multimedia content of the second source device based on the priority;
  transmitting, by the first source device, a response message including a determination result for whether to allow streaming of the second multimedia content to the sink device in response to the request message;
  transmitting, by the first source device, a streaming stop message of the first multimedia content to the sink device when the first source device allows streaming of the second multimedia content; and
  receiving, by the first source device, a streaming stop response message from the sink device in response to the streaming stop message,
  wherein the request message includes one of a name, a MAC address, and an identification (ID) of the second source device, and
  wherein the parameter information includes at least one of: remaining energy, a supplied power method, a resource for content streaming, a received signal strength indication (RSSI), and a number of connections.

2. The method of claim 1, wherein the first source device enters an idle state when the steaming stop response message is received.

3. The method of claim 2, wherein:
  the first source device streams the first multimedia content to the sink device; and
  the second source device enters an idle state when the first source device in the idle state receives a play signal from a user.

4. The method of claim 2, further comprising releasing a resource and a transport channel for the first multimedia content.

5. A method for content streaming through a wireless communication system including a plurality of source devices and one sink device, the method comprising:
  connecting to a second source device by the sink device playing first multimedia content of a first source device for multimedia content streaming;
  determining, by the sink device, whether to allow streaming of the second multimedia content of the connected second source device based on a first priority of the first source device and a second priority of the second source device;
  transmitting, by the sink device, a determination result message for whether to allow the streaming to the first and the second source device;
  receiving, by the sink device, a streaming stop message of the first multimedia content from the first source device when the sink device allows streaming of the second multimedia content; and
  transmitting, by the sink device, a streaming stop response message to the first source device in response to the streaming stop message,
  wherein the first priority is determined based on a first parameter information including at least one of: a first amount of remaining energy, a first supplied power method, a first resource for content streaming, a first received signal strength indication (RSSI), and a first number of connections, and
  wherein the second priority is determined based on a second parameter information including at least one of: a second amount of remaining energy, a second supplied power method, a second resource for content streaming, a second RSSI, and a second number of connections.

6. The method of claim 5, wherein the first source device enters an idle state when the streaming stop response message is received.

7. The method of claim 5, wherein the method for content streaming further comprises:
  receiving a first message including the first parameter information from the first source device; and receiving a second message including the second parameter information from the second source device,
wherein the first parameter information is related to the state and the surroundings of the first source device, and
wherein the second parameter information is related to the state and the surroundings of the second source device.

8. The method of claim 5, further comprising:
receiving a request message for requesting endpoint information supporting the sink device from the second source device; and
transmitting a response message including the endpoint information for streaming multimedia content to the second source device.

9. In a first source device streaming first multimedia content by using Bluetooth communication in a wireless communication system, a device comprising:
a communication unit for carrying out wired or wireless communication to and from the outside; and
a controller functionally connected to the communication unit, the controller being configured to:
control the communication unit to receive a request message related to allowing streaming of second multimedia content of a second source device from a sink device, the request message including a parameter information for determining a priority of the second source device;
determine whether to allow streaming of the second multimedia content of the second source device based on the priority;
control the communication unit to transmit a response message including a determination result for whether to allow streaming of the second multimedia content to the sink device in response to the request message;
control the communication unit to transmit a streaming stop message of the first multimedia content to the sink device when streaming of the second multimedia content is allowed; and
control the communication unit to receive a streaming stop response message from the sink device in response to the streaming stop message,
wherein the request message includes one from among a name, MAC address, and identification (ID) of the second source device, and
wherein the parameter information includes at least one of: remaining energy, a supplied power method, a resource for content streaming, a received signal strength indication (RSSI), and a number of connections.

10. The device of claim 9, wherein the controller controls the first source device to enter an idle state when the streaming stop response message is received.

11. The device of claim 10, further comprising a user interface for receiving a signal from a user, wherein the controller is further configured to control an output unit to stream the first multimedia content when a play signal is received from the user interface.

12. In a sink device streaming multimedia content of source devices by using Bluetooth communication in a wireless communication system, a device comprising:
a communication unit for carrying out wired or wireless communication to and from the outside;
an output unit for streaming the multimedia content; and
a controller functionally connected to the communication unit, the controller being configured to:
control a connection to a first source device or a second source device for streaming of the multimedia content;
control the output unit to stream first multimedia content of the first source device or second multimedia content of the second source device,
determine whether to allow streaming of the second multimedia content of the connected second source device based on a first priority of the first source device and a second priority of the second source device;
control the communication unit to transmit a determination result message for whether to allow the streaming to the first and the second source device;
control the communication unit to receive a streaming stop message of the first multimedia content from the first source device when streaming of the second multimedia content is allowed; and
control the communication unit to transmit a streaming stop response message to the first source device in response to the streaming stop message,
wherein the first priority is determined based on a first parameter information including at least one of: a first amount of remaining energy, a first supplied power method, a first resource for content streaming, a first received signal strength indication (RSSI), and a first number of connections, and
wherein the second priority is determined based on a second parameter information including at least one of: a second amount of remaining energy, a second supplied power method, a second resource for content streaming, a second RSSI, and a second number of connections.

13. The device of claim 12, wherein the controller is further configured to:
control the communication unit to receive a first message including the first parameter information from the first source device; and
control the communication unit to receive a second message including the second parameter information from the second source device,
wherein the first parameter information is related to the state and the surroundings of the first source device, and
wherein the second parameter information is related to the state and the surroundings of the second source device.

* * * * *